(12) United States Patent
Lavian et al.

(10) Patent No.: US 8,537,989 B1
(45) Date of Patent: Sep. 17, 2013

(54) DEVICE AND METHOD FOR PROVIDING ENHANCED TELEPHONY

(76) Inventors: Tal Lavian, Sunnyvale, CA (US); Zvi Or-Bach, San Jose, CA (US)

(*) Notice: Subject to any disclaimer, the term of this patent is extended or adjusted under 35 U.S.C. 154(b) by 339 days.

(21) Appl. No.: 13/022,768

(22) Filed: Feb. 8, 2011

Related U.S. Application Data

(63) Continuation-in-part of application No. 12/699,618, filed on Feb. 3, 2010.

(51) Int. Cl.
*H04M 11/00* (2006.01)

(52) U.S. Cl.
USPC ..................................... 379/93.17; 379/93.25

(58) Field of Classification Search
USPC ................................ 379/93.17, 93.25, 93.26
See application file for complete search history.

(56) References Cited

U.S. PATENT DOCUMENTS

| | | | |
|---|---|---|---|
| 4,653,045 A | 3/1987 | Stanley et al. |
| 4,736,405 A | 4/1988 | Akiyama |
| 4,897,866 A | 1/1990 | Majmudar et al. |
| 5,006,987 A | 4/1991 | Harless |
| 5,007,429 A | 4/1991 | Treatch et al. |
| 5,027,400 A | 6/1991 | Baji et al. |
| 5,086,385 A | 2/1992 | Launey et al. |
| 5,144,548 A | 9/1992 | Salandro |
| 5,265,014 A | 11/1993 | Haddock et al. |
| 5,294,229 A | 3/1994 | Hartzell et al. |
| 5,335,276 A | 8/1994 | Thompson et al. |
| 5,416,831 A | 5/1995 | Chewning, III et al. |
| 5,417,575 A | 5/1995 | McTaggart |
| 5,422,809 A | 6/1995 | Griffin et al. |
| 5,465,213 A | 11/1995 | Ross |
| 5,465,401 A | 11/1995 | Thompson |
| 5,475,399 A | 12/1995 | Borsuk |
| 5,499,330 A | 3/1996 | Lucas et al. |
| 5,519,809 A | 5/1996 | Husseiny et al. |
| 5,533,102 A | 7/1996 | Robinson et al. |
| 5,550,746 A | 8/1996 | Jacobs |
| 5,572,581 A | 11/1996 | Sattar et al. |
| 5,585,858 A | 12/1996 | Harper et al. |

(Continued)

FOREIGN PATENT DOCUMENTS

| | | |
|---|---|---|
| EP | 1225754 A3 | 7/2003 |
| EP | 1001597 A3 | 9/2003 |

(Continued)

OTHER PUBLICATIONS

Yin, M. and Zhai, S., "The Benefits of Augmenting Telephone Voice Menu Navigation with Visual Browsing and Search," CHI'06 Proceedings of the SIGCHI conference on Human Factors in computing systems: pp. 319-328, ACM, Montreal, Canada (Apr. 2006).

(Continued)

*Primary Examiner* — Stella Woo

(57) ABSTRACT

Embodiments of the invention provide a communication device. The communication device comprises a database comprising at least one visual Interactive Voice Response (IVR) menu associated with each of a plurality of destinations. The communication device also comprises means for dialing a phone number of a destination of the plurality of destinations based on a predefined calling information, wherein the predefined calling information is selected from a visual IVR menu associated with the destination; means for receiving information from the dialed destination based on the predefined calling information; and means for displaying the received information.

17 Claims, 10 Drawing Sheets

(56) References Cited

U.S. PATENT DOCUMENTS

| | | |
|---|---|---|
| 5,586,235 A | 12/1996 | Kauffman |
| 5,588,044 A | 12/1996 | Lofgren et al. |
| 5,592,538 A | 1/1997 | Kosowsky et al. |
| 5,606,361 A | 2/1997 | Davidsohn et al. |
| 5,633,909 A | 5/1997 | Fitch |
| 5,633,916 A | 5/1997 | Goldhagen et al. |
| 5,657,221 A | 8/1997 | Warman et al. |
| 5,689,648 A | 11/1997 | Diaz et al. |
| 5,724,412 A | 3/1998 | Srinivasan |
| 5,739,814 A | 4/1998 | Ohara et al. |
| 5,740,549 A | 4/1998 | Reilly et al. |
| 5,768,142 A | 6/1998 | Jacobs |
| 5,790,652 A | 8/1998 | Gulley et al. |
| 5,794,205 A | 8/1998 | Walters et al. |
| 5,796,806 A | 8/1998 | Birckbichler |
| 5,802,283 A | 9/1998 | Grady et al. |
| 5,802,526 A | 9/1998 | Fawcett et al. |
| 5,807,336 A | 9/1998 | Russo et al. |
| 5,819,225 A | 10/1998 | Eastwood et al. |
| 5,822,404 A | 10/1998 | Cave |
| 5,822,405 A | 10/1998 | Astarabadi |
| 5,838,682 A | 11/1998 | Dekelbaum et al. |
| 5,838,775 A | 11/1998 | Montalbano |
| 5,867,816 A | 2/1999 | Nussbaum |
| 5,873,068 A | 2/1999 | Beaumont et al. |
| 5,885,083 A | 3/1999 | Ferrell |
| 5,885,245 A | 3/1999 | Lynch et al. |
| 5,890,123 A | 3/1999 | Brown et al. |
| 5,892,813 A | 4/1999 | Morin et al. |
| 5,907,793 A | 5/1999 | Reams |
| 5,912,952 A | 6/1999 | Brendzel |
| 5,913,195 A | 6/1999 | Weeren et al. |
| 5,920,477 A | 7/1999 | Hoffberg et al. |
| 5,937,040 A | 8/1999 | Wrede et al. |
| 5,940,488 A | 8/1999 | DeGrazia et al. |
| 5,948,040 A | 9/1999 | DeLorme et al. |
| 5,956,034 A | 9/1999 | Sachs et al. |
| 5,982,875 A | 11/1999 | Lieben et al. |
| 5,987,103 A | 11/1999 | Martino |
| 6,009,398 A | 12/1999 | Mueller et al. |
| 6,014,428 A | 1/2000 | Wolf |
| 6,020,915 A | 2/2000 | Bruno et al. |
| 6,049,779 A | 4/2000 | Berkson |
| 6,055,513 A | 4/2000 | Katz et al. |
| 6,062,863 A | 5/2000 | Kirksey et al. |
| 6,088,429 A | 7/2000 | Garcia |
| 6,088,712 A | 7/2000 | Huang et al. |
| 6,091,805 A | 7/2000 | Watson |
| 6,091,956 A | 7/2000 | Hollenberg |
| 6,104,790 A | 8/2000 | Narayanaswami |
| 6,144,848 A | 11/2000 | Walsh et al. |
| 6,148,065 A | 11/2000 | Katz |
| 6,169,734 B1 | 1/2001 | Wilson |
| 6,212,547 B1 | 4/2001 | Ludwig et al. |
| 6,228,921 B1 | 5/2001 | Kasemann et al. |
| 6,229,694 B1 | 5/2001 | Kono |
| 6,230,197 B1 | 5/2001 | Beck et al. |
| 6,259,444 B1 | 7/2001 | Palmer et al. |
| 6,263,064 B1 | 7/2001 | O'Neal et al. |
| 6,273,726 B1 | 8/2001 | Kirksey et al. |
| 6,321,198 B1 | 11/2001 | Hank et al. |
| 6,335,678 B1 | 1/2002 | Heutschi |
| 6,366,650 B1 | 4/2002 | Rhie et al. |
| 6,373,817 B1 | 4/2002 | Kung et al. |
| 6,400,807 B1 | 6/2002 | Hewitt et al. |
| 6,405,033 B1 | 6/2002 | Kennedy, III et al. |
| 6,408,301 B1 | 6/2002 | Patton et al. |
| 6,427,063 B1 | 7/2002 | Cook et al. |
| 6,445,694 B1 | 9/2002 | Swartz |
| 6,449,595 B1 | 9/2002 | Arslan et al. |
| 6,456,706 B1 | 9/2002 | Blood et al. |
| 6,460,057 B1 | 10/2002 | Butler et al. |
| 6,463,145 B1 | 10/2002 | O'Neal et al. |
| 6,482,156 B2 | 11/2002 | Iliff |
| 6,505,146 B1 | 1/2003 | Blackmer |
| 6,510,411 B1 | 1/2003 | Norton et al. |
| 6,529,500 B1 | 3/2003 | Pandharipande |
| 6,560,320 B1 | 5/2003 | Paleiov et al. |
| 6,603,840 B2 | 8/2003 | Fellingham et al. |
| 6,606,611 B1 | 8/2003 | Khan |
| 6,606,741 B2 | 8/2003 | Kojima et al. |
| 6,636,835 B2 | 10/2003 | Ragsdale-Elliott et al. |
| 6,653,930 B1 | 11/2003 | Bonomo et al. |
| 6,658,389 B1 | 12/2003 | Alpdemir |
| 6,705,869 B2 | 3/2004 | Schwartz |
| 6,714,519 B2 | 3/2004 | Luzzatti et al. |
| 6,731,625 B1 | 5/2004 | Eastep et al. |
| 6,754,181 B1 | 6/2004 | Elliott et al. |
| 6,788,770 B1 | 9/2004 | Cook et al. |
| 6,791,583 B2 | 9/2004 | Tang et al. |
| 6,816,580 B2 | 11/2004 | Timmins |
| 6,820,037 B2 | 11/2004 | Simon |
| 6,820,062 B1 | 11/2004 | Gupta et al. |
| 6,826,194 B1 | 11/2004 | Vered et al. |
| 6,829,368 B2 | 12/2004 | Meyer et al. |
| 6,856,673 B1 | 2/2005 | Banks et al. |
| 6,862,713 B1 | 3/2005 | Kraft et al. |
| 6,865,268 B1 | 3/2005 | Matthews et al. |
| 6,885,737 B1 | 4/2005 | Gao et al. |
| 6,889,195 B2 | 5/2005 | Strandberg |
| 6,920,205 B2 | 7/2005 | Hahn et al. |
| 6,920,425 B1 | 7/2005 | Will et al. |
| 6,920,431 B2 | 7/2005 | Showghi et al. |
| 6,937,705 B1 | 8/2005 | Godfrey et al. |
| 6,968,506 B2 | 11/2005 | Yacovone et al. |
| 6,990,455 B2 | 1/2006 | Vozick et al. |
| 7,020,609 B2 | 3/2006 | Thrift et al. |
| 7,027,990 B2 | 4/2006 | Sussman |
| 7,036,128 B1 | 4/2006 | Julia et al. |
| 7,039,589 B2 | 5/2006 | Whitham |
| 7,047,196 B2 | 5/2006 | Calderone et al. |
| 7,065,188 B1 | 6/2006 | Mei et al. |
| 7,068,643 B1 | 6/2006 | Hammond |
| 7,092,738 B2 | 8/2006 | Creamer et al. |
| 7,100,118 B1 | 8/2006 | Klask |
| 7,130,391 B2 | 10/2006 | Janakiraman et al. |
| 7,136,480 B2 | 11/2006 | Mason |
| 7,139,591 B2 | 11/2006 | Callaghan et al. |
| 7,145,902 B2 | 12/2006 | Schindler et al. |
| 7,146,321 B2 | 12/2006 | Cyr et al. |
| 7,149,549 B1 | 12/2006 | Ortiz et al. |
| 7,159,008 B1 | 1/2007 | Wies et al. |
| 7,177,814 B2 | 2/2007 | Gong et al. |
| 7,180,889 B1 | 2/2007 | Kung et al. |
| 7,180,985 B2 | 2/2007 | Colson et al. |
| 7,181,401 B2 | 2/2007 | Johnson et al. |
| 7,181,502 B2 | 2/2007 | Incertis |
| 7,188,352 B2 | 3/2007 | Nathan et al. |
| 7,203,517 B2 | 4/2007 | Shimoda et al. |
| 7,206,745 B2 | 4/2007 | Sarukkai et al. |
| 7,206,809 B2 | 4/2007 | Ludwig et al. |
| 7,209,124 B2 | 4/2007 | Hunt et al. |
| 7,213,061 B1 | 5/2007 | Hite et al |
| 7,215,743 B2 | 5/2007 | Creamer et al. |
| 7,216,348 B1 | 5/2007 | deCarmo |
| 7,225,409 B1 | 5/2007 | Schnarel et al. |
| 7,225,455 B2 | 5/2007 | Bennington et al. |
| 7,228,492 B1 | 6/2007 | Graham |
| 7,231,636 B1 | 6/2007 | Evans |
| 7,231,656 B1 | 6/2007 | Nathan |
| 7,240,006 B1 | 7/2007 | Brocious et al. |
| 7,240,289 B2 | 7/2007 | Naughton et al. |
| 7,246,063 B2 | 7/2007 | James et al. |
| 7,248,885 B2 | 7/2007 | Benco et al. |
| 7,250,939 B2 | 7/2007 | Lira |
| 7,254,227 B2 | 8/2007 | Mumick et al. |
| 7,265,861 B2 | 9/2007 | Ranalli et al. |
| 7,266,185 B2 | 9/2007 | Trandal et al. |
| 7,266,186 B1 | 9/2007 | Henderson |
| 7,266,499 B2 | 9/2007 | Surace et al. |
| 7,272,222 B2 | 9/2007 | Joseph et al. |
| 7,272,497 B2 | 9/2007 | Koshiji et al. |
| 7,277,854 B2 | 10/2007 | Bennett et al. |
| 7,280,097 B2 | 10/2007 | Chen et al. |

| | | | |
|---|---|---|---|
| 7,280,646 B2 | 10/2007 | Urban et al. | |
| 7,280,651 B2 | 10/2007 | Anderson | |
| 7,286,990 B1 | 10/2007 | Edmonds et al. | |
| 7,289,608 B2 | 10/2007 | Kumhyr | |
| 7,289,904 B2 | 10/2007 | Uyeki | |
| 7,299,405 B1 | 11/2007 | Lee et al. | |
| 7,303,121 B2 | 12/2007 | Martinez | |
| 7,319,477 B2 | 1/2008 | Katz | |
| 7,324,947 B2 | 1/2008 | Jordan et al. | |
| 7,328,239 B1 | 2/2008 | Berberian et al. | |
| 7,330,890 B1 | 2/2008 | Partovi et al. | |
| 7,353,016 B2 | 4/2008 | Roundtree et al. | |
| 7,392,193 B2 | 6/2008 | Mault | |
| 7,398,215 B2 | 7/2008 | Mesbah et al. | |
| 7,406,413 B2 | 7/2008 | Geppert et al. | |
| 7,412,533 B1 | 8/2008 | Johnson et al. | |
| 7,433,452 B2 | 10/2008 | Taylor et al. | |
| 7,440,898 B1 | 10/2008 | Eberle et al. | |
| 7,450,112 B2 | 11/2008 | Shneidman | |
| 7,466,803 B2 | 12/2008 | Burg et al. | |
| 7,492,883 B2 | 2/2009 | Kumhyr | |
| 7,539,484 B2 | 5/2009 | Roundtree | |
| 7,546,143 B2 | 6/2009 | Nelson et al. | |
| 7,584,249 B2 | 9/2009 | Mummick et al. | |
| 7,606,741 B2 | 10/2009 | King et al. | |
| 7,646,858 B2 | 1/2010 | Salafia et al. | |
| 7,693,720 B2 | 4/2010 | Kennewick et al. | |
| 7,720,091 B2 | 5/2010 | Faber et al. | |
| 7,729,490 B2 | 6/2010 | Hemm et al. | |
| 7,757,173 B2 | 7/2010 | Beaman | |
| 7,809,376 B2 | 10/2010 | Letourneau et al. | |
| 7,813,485 B2 | 10/2010 | Yin et al. | |
| 7,843,899 B2 | 11/2010 | Burritt | |
| 7,864,944 B2 | 1/2011 | Khouri et al. | |
| 7,908,381 B2 | 3/2011 | Koch et al. | |
| 7,966,188 B2 | 6/2011 | Ativanichayaphong et al. | |
| 8,000,454 B1 | 8/2011 | Or-Bach et al. | |
| 8,023,624 B2 | 9/2011 | Kargman et al. | |
| 8,054,952 B1 | 11/2011 | Or-Bach et al. | |
| 8,155,280 B1 | 4/2012 | Or-Bach et al. | |
| 8,160,215 B2 | 4/2012 | Or-Bach et al. | |
| 2002/0055844 A1 | 5/2002 | L'Esperance et al. | |
| 2002/0147986 A1 | 10/2002 | Michael et al. | |
| 2003/0005126 A1 | 1/2003 | Schwartz et al. | |
| 2003/0007625 A1 | 1/2003 | Pines et al. | |
| 2003/0033382 A1 | 2/2003 | Bogolea et al. | |
| 2003/0074198 A1* | 4/2003 | Sussman | 704/270.1 |
| 2003/0112931 A1 | 6/2003 | Brown et al. | |
| 2004/0034561 A1 | 2/2004 | Smith | |
| 2004/0122941 A1 | 6/2004 | Creamer et al. | |
| 2004/0198316 A1 | 10/2004 | Johnson | |
| 2004/0204116 A1 | 10/2004 | Ben-Efraim et al. | |
| 2005/0004977 A1 | 1/2005 | Roberts et al. | |
| 2005/0055310 A1 | 3/2005 | Drewett et al. | |
| 2006/0203977 A1 | 9/2006 | Erhart et al. | |
| 2006/0239422 A1 | 10/2006 | Rinaldo et al. | |
| 2006/0259424 A1 | 11/2006 | Turcotte et al. | |
| 2006/0262921 A1 | 11/2006 | Eppel et al. | |
| 2006/0285662 A1 | 12/2006 | Yin et al. | |
| 2007/0026852 A1 | 2/2007 | Logan et al. | |
| 2007/0032247 A1 | 2/2007 | Shaffer et al. | |
| 2007/0038513 A1 | 2/2007 | Flax et al. | |
| 2007/0094109 A1 | 4/2007 | Perry | |
| 2007/0123223 A1 | 5/2007 | Letourneau et al. | |
| 2007/0239537 A1 | 10/2007 | Protheroe et al. | |
| 2007/0243887 A1 | 10/2007 | Bandhole et al. | |
| 2007/0298776 A1 | 12/2007 | Arlene | |
| 2008/0066015 A1 | 3/2008 | Blankenhorn | |
| 2008/0095330 A1 | 4/2008 | Jin et al. | |
| 2008/0226042 A1 | 9/2008 | Singh | |
| 2008/0250334 A1 | 10/2008 | Price | |
| 2009/0041215 A1 | 2/2009 | Schmitt et al. | |
| 2009/0116414 A1 | 5/2009 | Or et al. | |
| 2009/0136014 A1 | 5/2009 | Bigue et al. | |
| 2009/0154666 A1* | 6/2009 | Rios et al. | 379/88.18 |
| 2009/0202050 A1 | 8/2009 | Berger et al. | |
| 2009/0207980 A1 | 8/2009 | Berger et al. | |
| 2009/0207996 A1 | 8/2009 | Berger et al. | |
| 2009/0225788 A1 | 9/2009 | Kephart et al. | |
| 2009/0228908 A1 | 9/2009 | Margis et al. | |
| 2009/0276441 A1 | 11/2009 | Malik | |
| 2009/0276708 A1 | 11/2009 | Smith et al. | |
| 2009/0280863 A1 | 11/2009 | Shin et al. | |
| 2009/0285380 A1 | 11/2009 | Chen et al. | |
| 2010/0007028 A1 | 1/2010 | Fachmann et al. | |
| 2010/0021030 A1 | 1/2010 | Collins et al. | |
| 2010/0049654 A1 | 2/2010 | Pilo et al. | |
| 2010/0087175 A1 | 4/2010 | Roundtree | |
| 2010/0100377 A1 | 4/2010 | Madhavapeddi et al. | |
| 2010/0166158 A1 | 7/2010 | Costello et al. | |
| 2010/0172481 A1 | 7/2010 | Canu et al. | |
| 2010/0189250 A1 | 7/2010 | Williams et al. | |
| 2010/0191608 A1 | 7/2010 | Mikkelsen et al. | |
| 2011/0009096 A1 | 1/2011 | Rotsztein et al. | |
| 2011/0014952 A1 | 1/2011 | Minton | |
| 2011/0060683 A1 | 3/2011 | Salmon Rock et al. | |
| 2011/0091021 A1 | 4/2011 | Adkar et al. | |
| 2011/0099116 A1 | 4/2011 | Gabel | |
| 2011/0276408 A1 | 11/2011 | Toole | |
| 2012/0063574 A1 | 3/2012 | Or-Bach et al. | |

FOREIGN PATENT DOCUMENTS

| | | | |
|---|---|---|---|
| EP | 1351477 A1 | 10/2003 | |
| EP | 1120954 A3 | 6/2005 | |
| EP | 1545101 A3 | 12/2005 | |
| EP | 774853 B1 | 5/2006 | |
| EP | 1874018 A1 | 1/2008 | |
| JP | 2004274425 A | 9/2004 | |
| WO | 9819259 A1 | 5/1998 | |
| WO | 9840826 A3 | 12/1998 | |
| WO | 9856158 A3 | 3/1999 | |
| WO | 9848551 A3 | 4/1999 | |
| WO | 0131497 A1 | 5/2001 | |
| WO | 0157851 A1 | 8/2001 | |
| WO | 0165871 A1 | 9/2001 | |
| WO | 9820409 A8 | 11/2001 | |
| WO | 0217604 A1 | 2/2002 | |
| WO | 2004049306 A1 | 6/2004 | |
| WO | 2004064299 A3 | 7/2005 | |
| WO | 2007012831 A1 | 2/2007 | |
| WO | 2007081929 A3 | 1/2008 | |
| WO | 2008086320 A1 | 7/2008 | |
| WO | WO 2008/086320 A1 | 7/2008 | |
| WO | 2009006173 A3 | 3/2009 | |
| WO | 2009100477 A1 | 8/2009 | |

OTHER PUBLICATIONS

Damhuis, M., et al., "A Multimodal Consumer Information Server with IVR Menu," 2nd IEEE Workshop on Interactive Voice Technology for Telecommunications Applications (IVTTA94): pp. 73-76, Kyoto, Japan (Sep. 1994).

Shah, S.AA., et al., "Interactive Voice Response with Pattern Recognition Based on Artificial Neural Network Approach," International Conference on Emerging Technologies: pp. 249-252, (Nov. 2007).

Trihandoyo, A., et al., "A real-time speech recognition architecture for a multi-channel interactive voice response system," International Conference on Acoustics, Speech, and Signal Processing vol. 4: pp. 2687-2690, (1995).

Hattori, S., et al., "A multimedia intelligent message communication system for distributed coordination environments," Electronics & Communications in Japan, Part I—Communications, vol. 76, No. 1, pp. 11-23 (1993).

Patent abstracts of Japan, vol. 097, No. 001, Jan. 31, 1997 & JP 08 242307 A (Canon Inc), Sep. 17, 1996.

Kalva, H., et al., "Delivering Object-Based Audio-Visual Services," IEEE Transactions on Consumer Electronics, vol. 45, No. 4, pp. 1108-1111, (1999).

Schmandt, "Phoneshell: the telephone as computer terminal," Proceedings of first ACM International Conference on Multimedia, Anaheim, CA, US, pp. 373-381, (1993).

Himberg, J., et al., "Time Series Segmentation for Context Recognition in Mobile Devices", IEEE, 203-210, (2001).

Chris Schmandt and Stephen Casner, "Phonetool: Integrating Telephones and Workstations," IEEE Communication Society, Nov. 27-30, pp. 0970-0974, (1989).

Basinger, R. G., et al., "Calling Card Service—Overall Description and Operational Characteristics", The Bell System Technical Journal, (1982).

Cadiz et al. "Designing and Deploying an Information Awareness interface" CSCW'02, Nov. 2002, ACM, pp. 314-323.

Corcoran et al. disclose "User interface technologies for home appliances and networks", IEEE Trans. Consumer Elect; pp. 679-685, (1998).

Nancy Friedrich, "Graphical-User-Interface Module Eases Integration," Wireless Systems Design, Oct. 2004, 1 page.

Balachandran, R., et al., "Dialog System for Mixed Initiative One-Turn Address entry and Error Recovery," Proceedings of SIGDIAL 2009, the 10th Annual Meeting of the Special Interest Group in Discourse and Dialogue, pp. 152-155, Queen Mary University of London, Association of Computational Logistics, (2009).

Trihandoyo, A., et al.,"A real-time speech recognition architecture for a multi-channel interactive voice response system," *International Conference on Acoustics, Speech, and Signal Processing* vol. 4: pp. 2687-2690,(1995).

Co-pending U.S. Appl. No. 12/699,618, inventors Lavian, T. and Or-Bach, Z., filed Feb. 3, 2010, entitled "Systems and methods for visual presentation and selection of IVR menu."

Co-pending U.S. Appl. No. 12/707,714, inventors Lavian, T. and Or-Bach, Z., filed Feb. 18, 2010, entitled "Systems and methods for visual presentation and selection of IVR menu."

Co-pending U.S. Appl. No. 12/719,001, inventors Lavian, T. and Or-Bach, Z., filed Mar. 7, 2010, entitled "Systems and methods for visual presentation and selection of IVR menu."

Co-pending U.S. Appl. No. 12/879,318, inventors Lavian, T. and Or-Bach, Z., filed Sep. 10, 2010, entitled "Systems and methods for visual presentation and selection of IVR menu."

Co-pending U.S. Appl. No. 13/022,883, inventors Lavian, T. and Or-Bach, Z., filed Feb. 8, 2011, entitled "Systems and methods for visual presentation and selection of IVR menu."

Co-pending U.S. Appl. No. 13/113,825, inventors Lavian, T. and Or-Bach, Z., filed May 23, 2011, entitled "Portable universal communication device."

Co-pending U.S. Appl. No. 13/022,851, inventors Lavian, T. and Or-Bach, Z., filed Feb. 8, 2011, entitled "Device and method for providing enhanced telephony."

Co-pending U.S. Appl. No. 13/022,869, inventors Lavian, T. and Or-Bach, Z., filed Feb. 8, 2011, entitled "Systems and methods for visual presentation and selection of IVR menu."

Co-pending U.S. Appl. No. 13/022,909, inventors Lavian, T. and Or-Bach, Z., filed Feb. 8, 2011, entitled "Device and method for providing enhanced telephony."

Co-pending U.S. Appl. No. 13/046,532, inventors Lavian, T. and Or-Bach, Z., filed Mar. 11, 2011, entitled "Systems and methods for communicating with an interactive voice response system."

Co-pending U.S. Appl. No. 13/159,093, inventors Lavian, T. and Or-Bach, Z., filed Jun. 13, 2011, entitled "Systems and methods for visual presentation and selection of IVR menu."

Co-pending U.S. Appl. No. 13/185,027, inventors Lavian, T. and Or-Bach, Z., filed Jul. 18, 2011, entitled "Systems and methods for visual presentation and selection of IVR menu."

Co-pending U.S. Appl. No. 13/186,984, inventors Lavian, T. and Or-Bach, Z., filed Jul. 20, 2011, entitled "Systems and methods for visual presentation and selection of IVR menu."

* cited by examiner

DEVICE AND METHOD FOR PROVIDING ENHANCED TELEPHONY

CROSS REFERENCE TO RELATED APPLICATIONS

This application is a Continuation-In-Part (CIP) of U.S. Non-Provisional application Ser. No. 12/699,618 entitled 'Systems and methods for visual presentation and selection of IVR menu' and filed on Feb. 3, 2010.

FIELD OF THE INVENTION

The invention relates to telecommunications and more specifically the invention relates to scheduling a call to an Interactive Voice Response system of a destination in a communication network.

BACKGROUND OF THE INVENTION

Interactive Voice Response (IVR) technology is generally used to detect voice and key inputs from a caller. Various organizations such as banks, insurance companies, and other service providers use IVR technology to manage calls from their customers. Typically, IVR systems are used by organizations that have high call volumes. An objective for implementing the IVR systems is to provide the customers with a quick and good experience. Moreover, the cost of providing the services is reduced. Generally, IVR systems allow a user to interact with an audio response system. The IVR systems can provide prompts to a user and receive touch tone and/or spoken responses on the prompts from the user. Through such IVR dialogue the system collects sufficient information about the user to direct the call to the most appropriate resource, information processing system or the like. Various organizations such as banks, insurance companies, and other service providers use IVR system to manage calls from their customers. Typically, IVR systems are used by organizations that have high call volumes. An objective for implementing the IVR systems is to provide the users or customers with a quick and good experience. Moreover, or the cost of providing the services is reduced.

Typically, in case of an audio IVR menu the user calling the destination may have to listen and follow instructions on the menu to get a desired response or a function performed. Therefore, the process can be time consuming. Moreover, in case the user provides an incorrect input, the complete process may have to be repeated. Further, the IVR menu for an organization may be updated or changed regularly. For example, extension numbers inside an organization may be changed and correspondingly, the extension numbers associated with the IVR menu may be updated. As a result, a frequent user may not be able to reach a desired end by remembering a combination of numbers. Furthermore, the dialed destination may not include the information desired by the user. In such a case, the user may have to call the destination again for retrieving the desired information. Therefore, the user may become frustrated with the IVR systems.

Usually, the IVR menus are same for all the users. Therefore, the customer has to listen them carefully to select the appropriate option. The user may have to wait for long time for receiving information while interacting with the IVR systems. Moreover, sometimes the requested information might not be available at the time when the user calls the destination. Therefore, the user may have to either wait for long time or call again later. For example, the user may desire to talk to a customer care executive of the destination, who is busy at the time of the call. Therefore, the call of the user may be put on hold or he may be asked to call later.

A U.S. Pat. No. 7,460,652, assigned to AT&T Intellectual Property I, L.P., discloses techniques for call routing and communication with a call originator. The call may be received at an automated call handling system. Thereafter, the call is evaluated based on a set of business rules and routed to an interactive voice response unit based on the evaluation. Further, the interactive voice response unit automatically schedules and sends an email to the originator of the call. However, the scheduling of the email is performed after establishing a communication with the automated call handling system. Moreover, the scheduling is performed at the automated call handling system.

In the light of the above discussion, techniques are desired for providing enhanced telephony.

SUMMARY

Embodiments of the invention provide a communication device. The communication device comprises a database comprising at least one visual Interactive Voice Response (IVR) menu associated with each of a plurality of destinations. The communication device also comprises means for dialing a phone number of a destination of the plurality of destinations based on a predefined calling information, wherein the predefined calling information is selected from a visual IVR menu associated with the destination; means for receiving information from the dialed destination based on the predefined calling information; and means for displaying the received information.

A communication device is provided. The communication device comprises a processor. Further, the communication device comprises a memory coupled to the processor. The memory comprises a database comprising at least one IVR menu associated with each of a plurality of destinations. Further, the memory comprises instructions executable by the processor for dialing a phone number of a destination of the plurality of destinations based on a predefined calling information, wherein the predefined calling information is selected from a visual IVR menu associated with the destination, receiving information from the dialed destination based on the predefined calling information, and displaying the received information.

Embodiments of the invention disclose a method for providing enhanced telephony. The method comprises dialing a phone number of a destination of a plurality of destinations based on a predefined calling information, wherein the predefined calling information is selected from a visual IVR menu associated with the destination. Further, the method comprises receiving information from the dialed destination based on the predefined calling information. Furthermore, the method comprises displaying the received information.

An aspect of the invention allows a communication device to call a destination automatically according to the predefined calling information entered by a user.

Another aspect of the invention is to provide a communication device for scheduling a call in a communication network based on the predefined calling information.

Another aspect of the invention is to provide a method for scheduling a call in a communication network.

Yet another aspect of the invention is to provide a method for requesting and receiving information from a destination without any user intervention.

BRIEF DESCRIPTION OF THE DRAWINGS

Figure 1A:
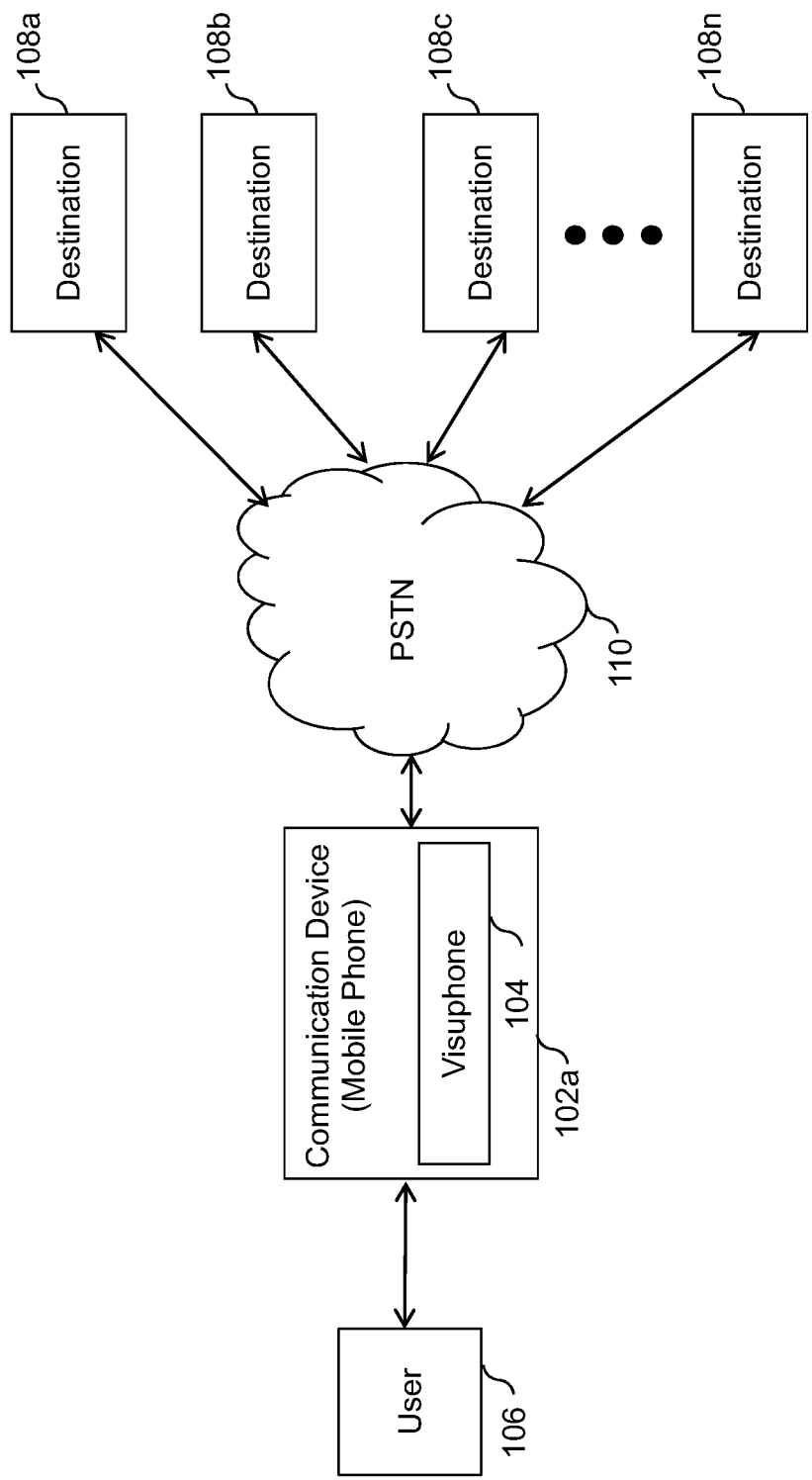
Figure 1B:
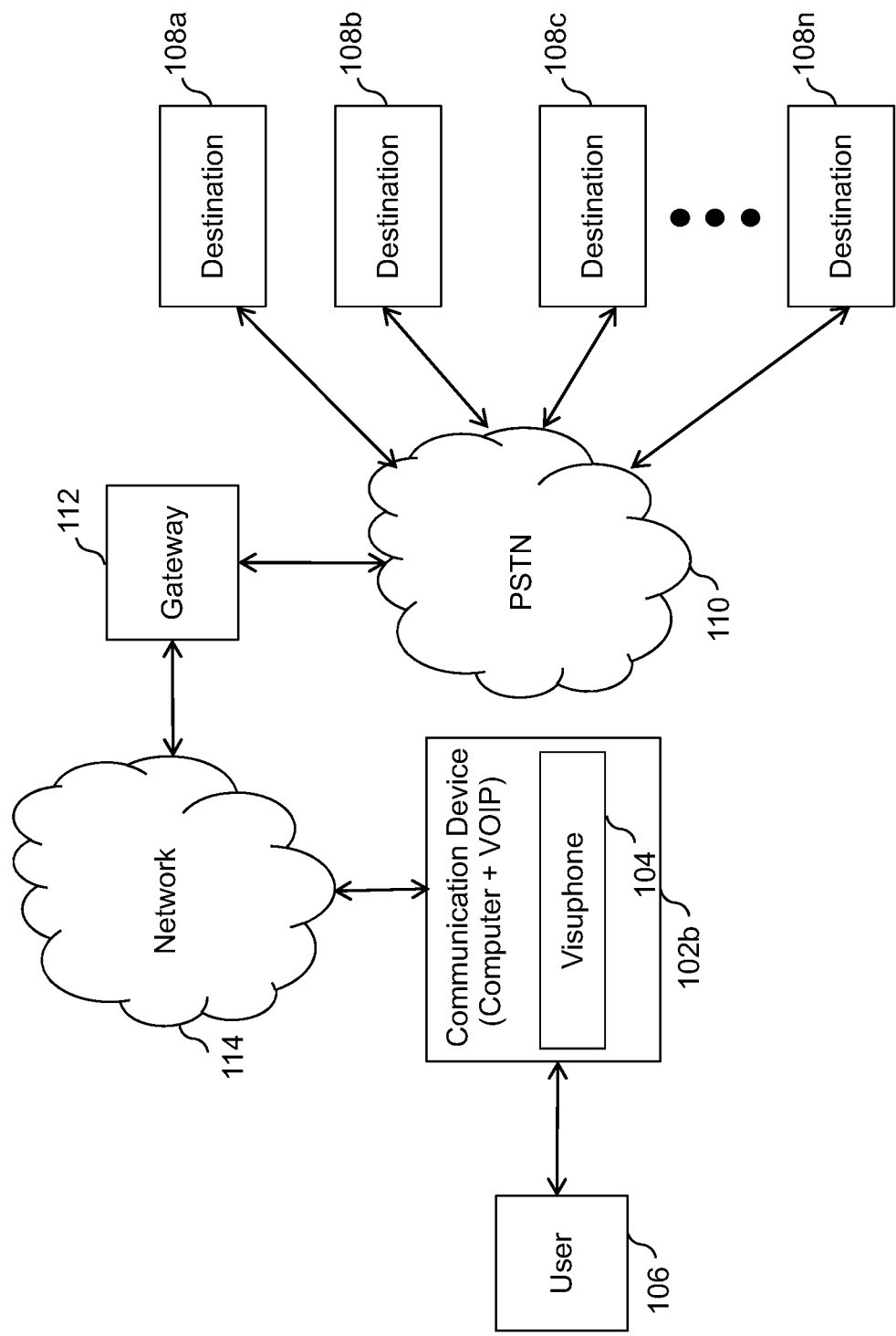
Figure 1C:
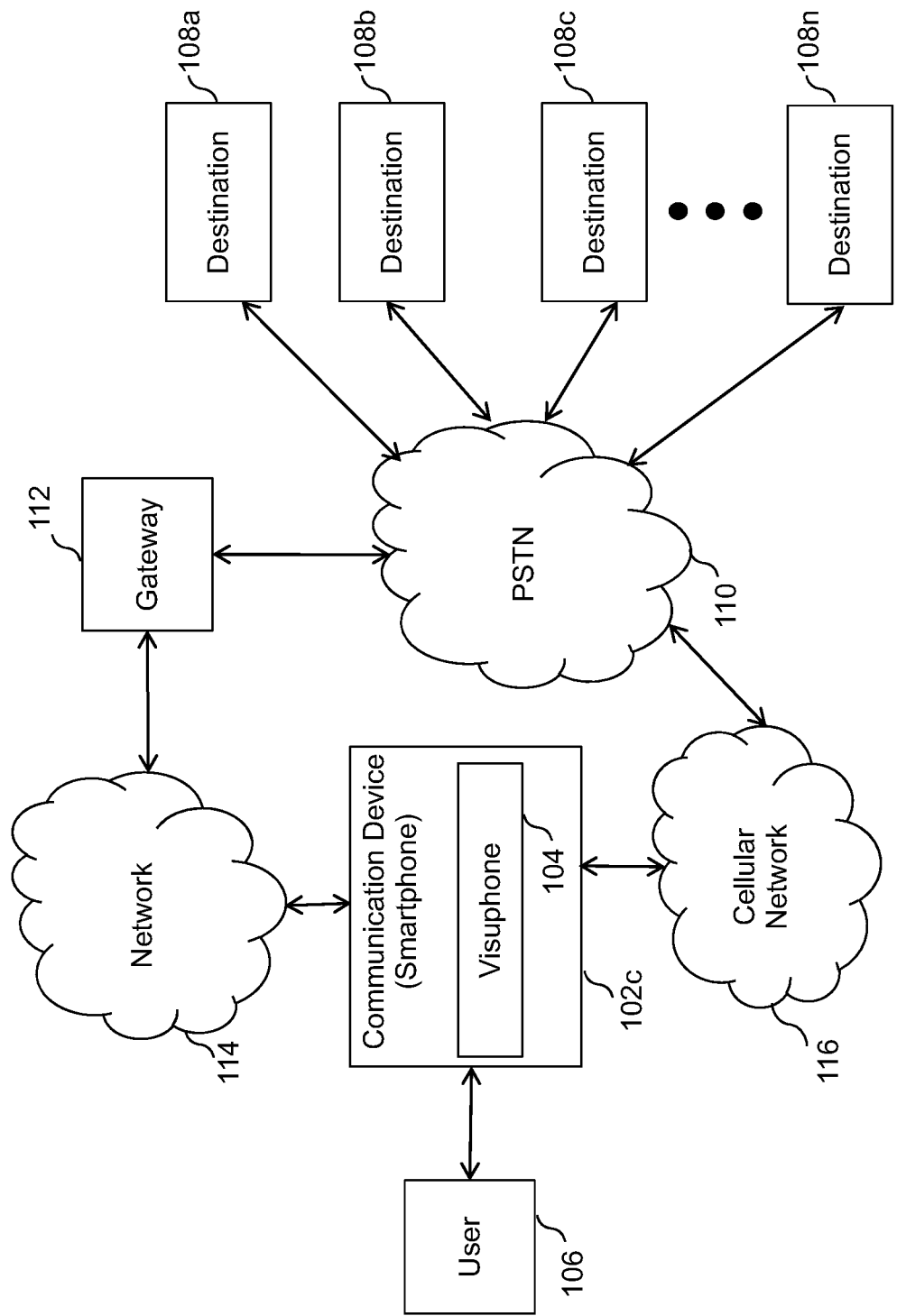
Figure 2:
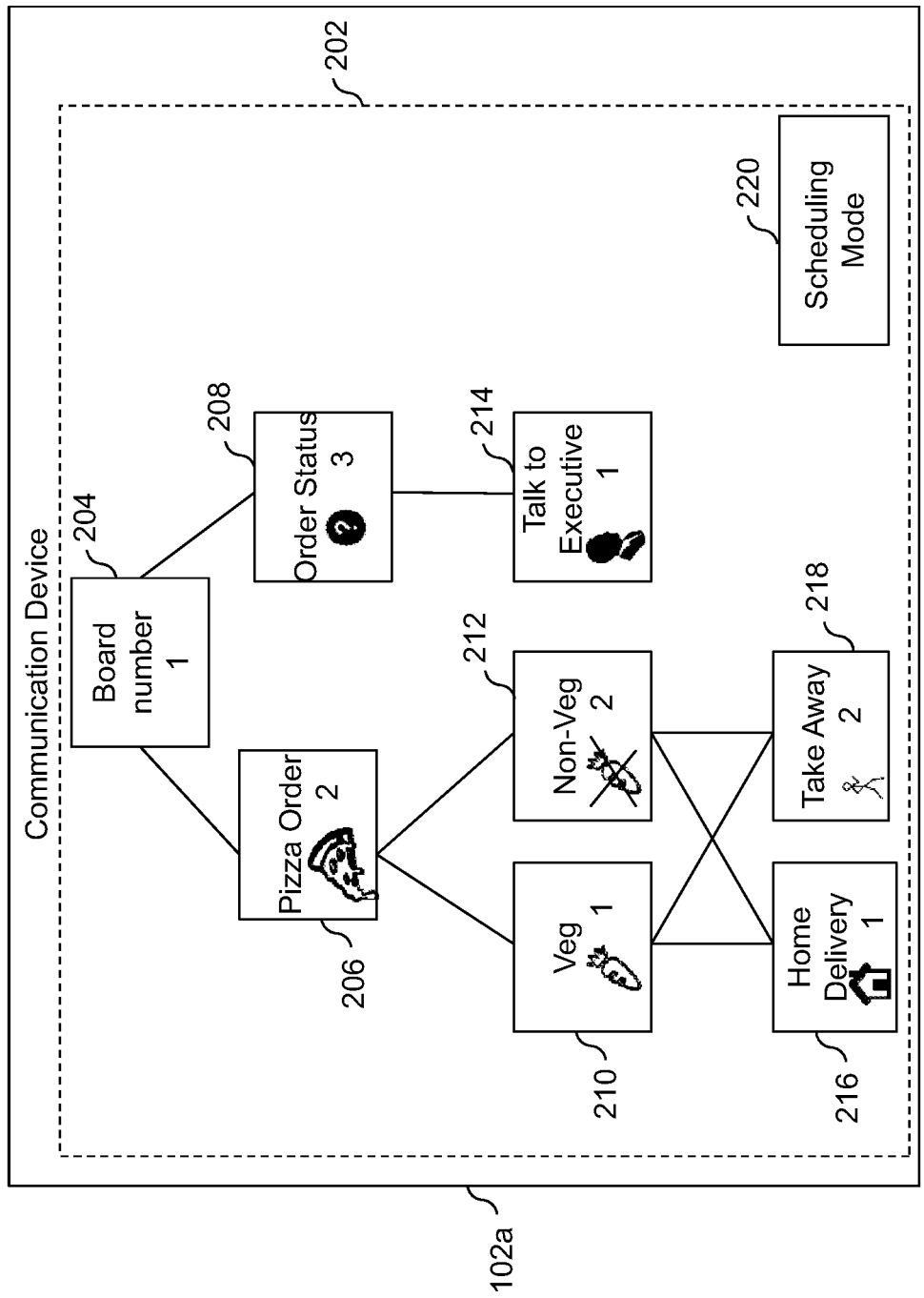
Figure 3:
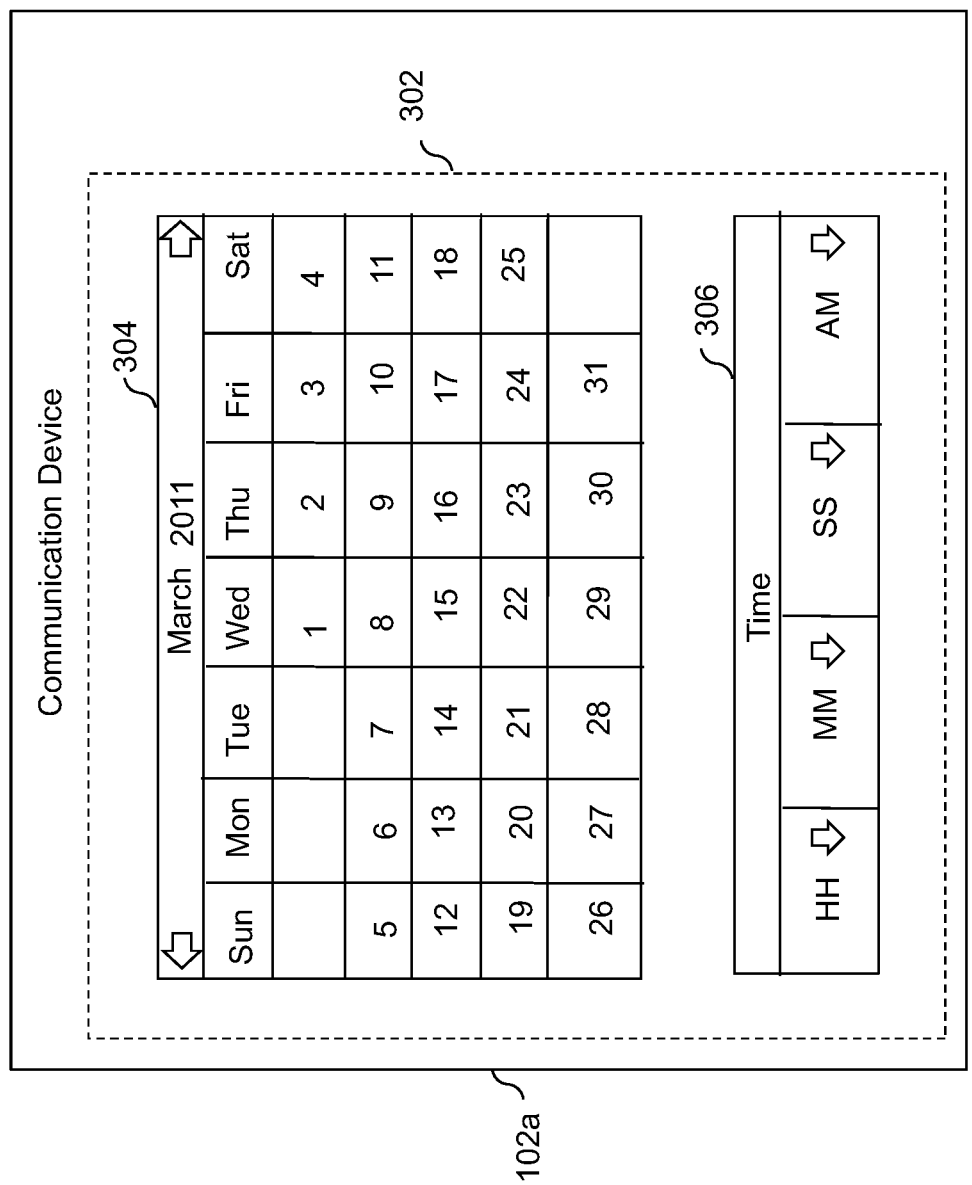
Figure 4A:
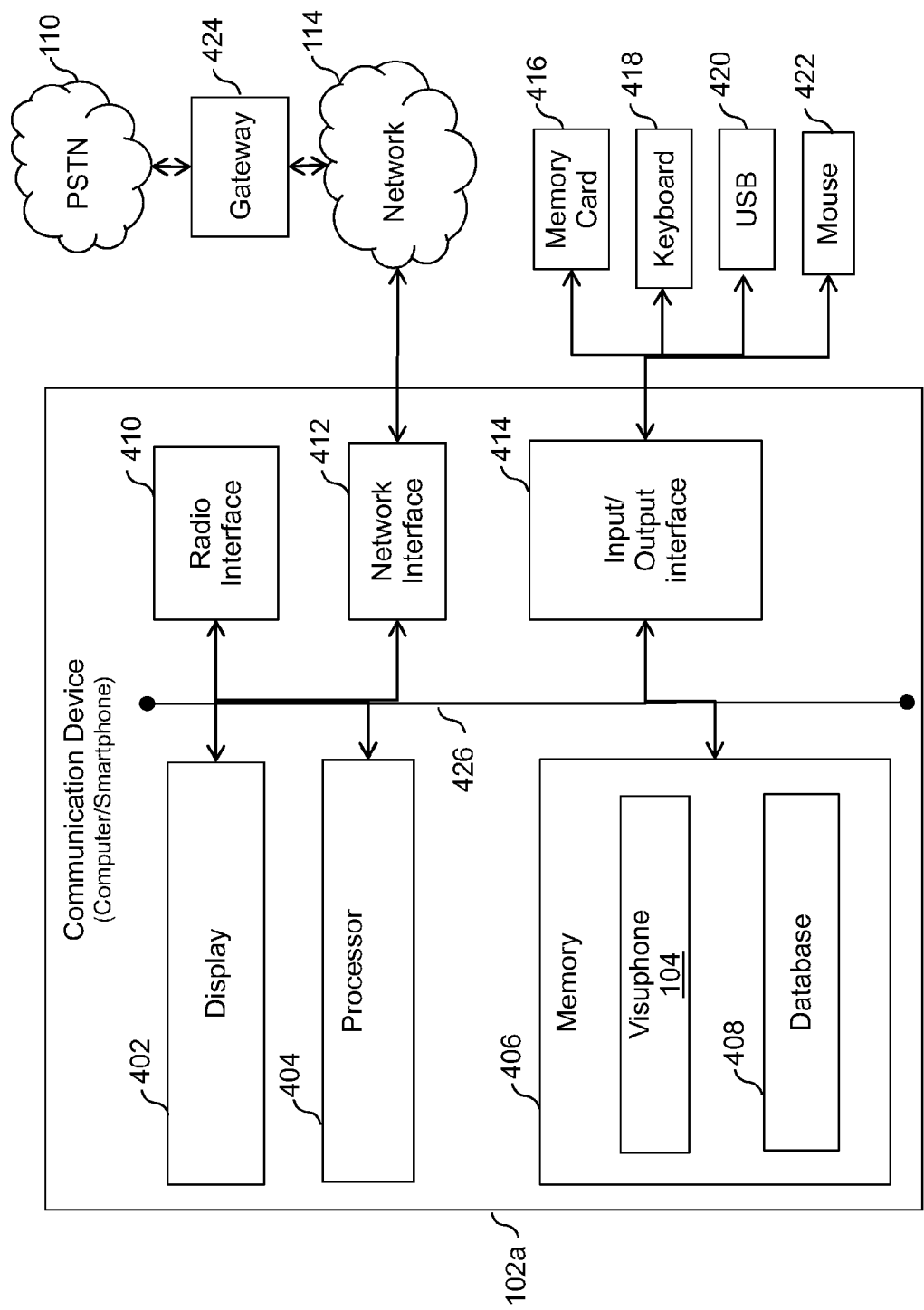
Figure 4B:
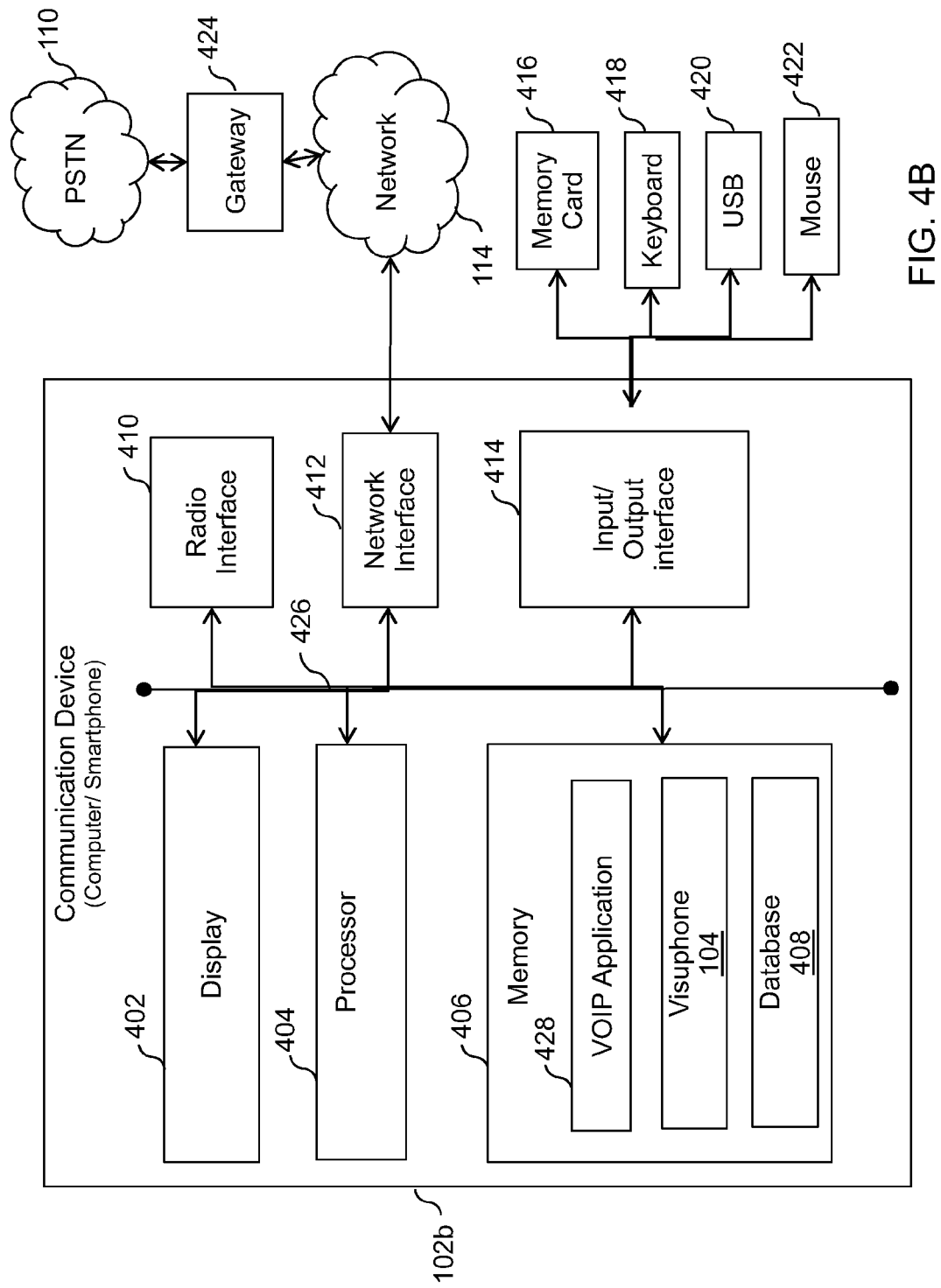
Figure 5:
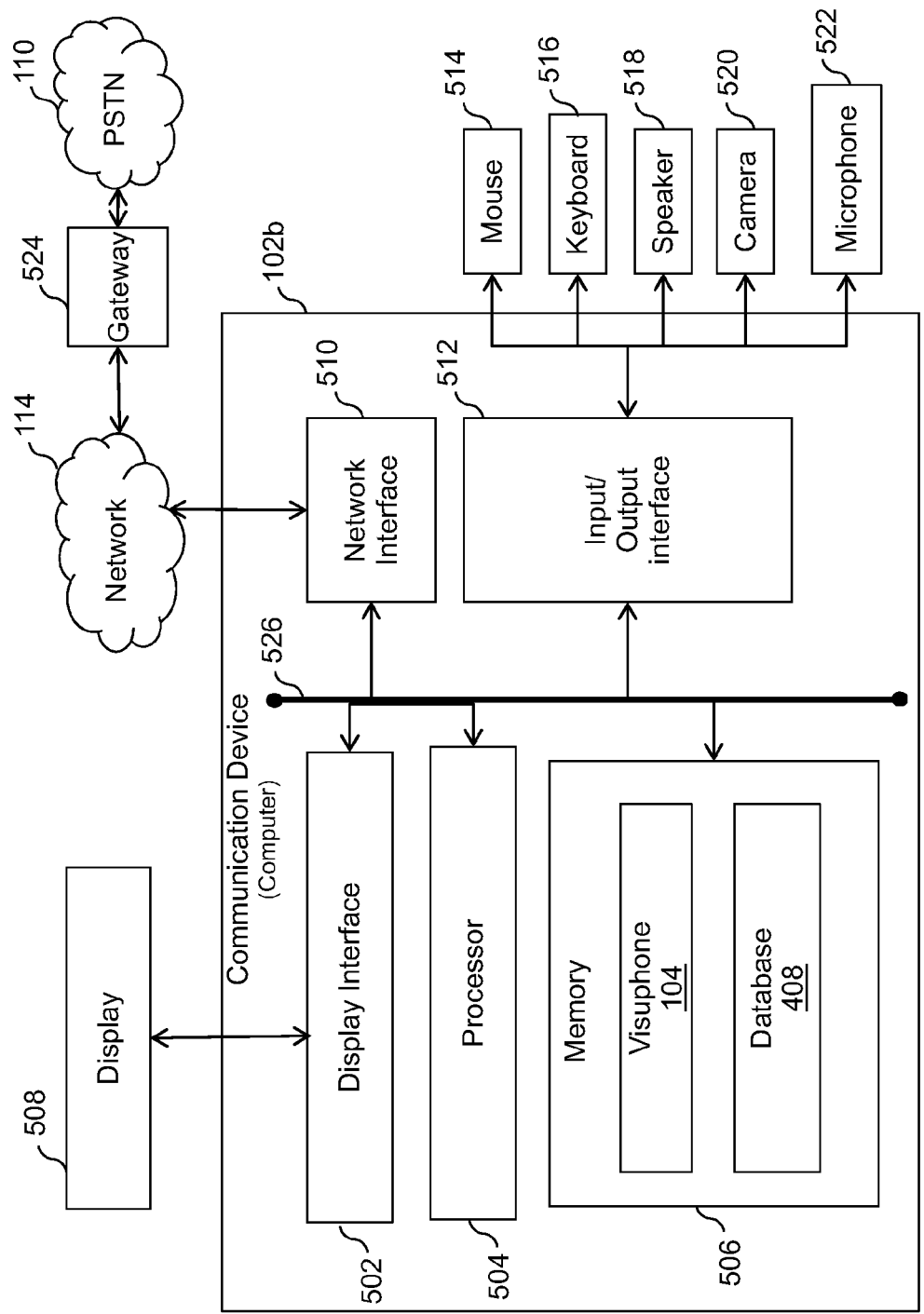
Figure 6A:
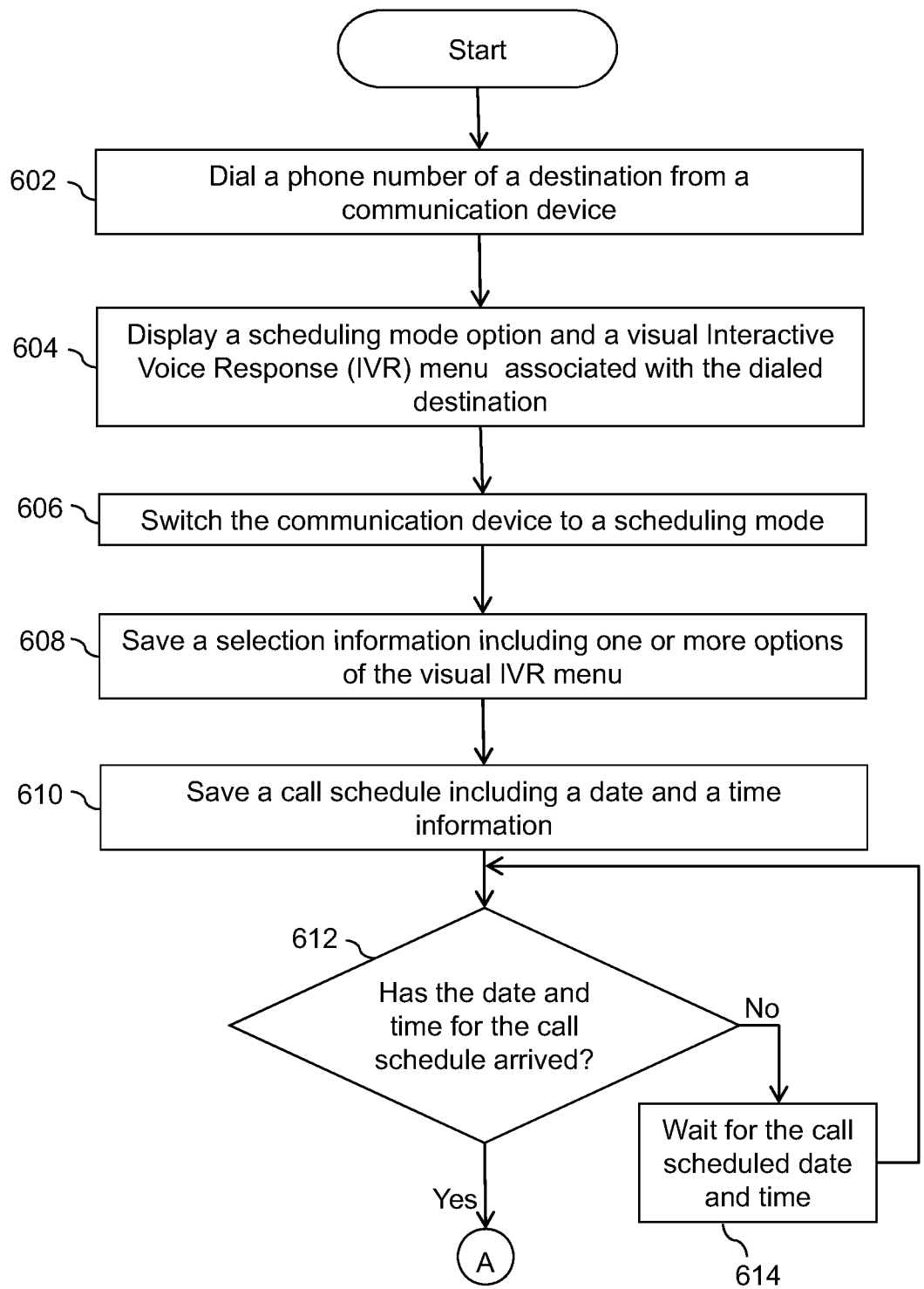
Figure 6B:
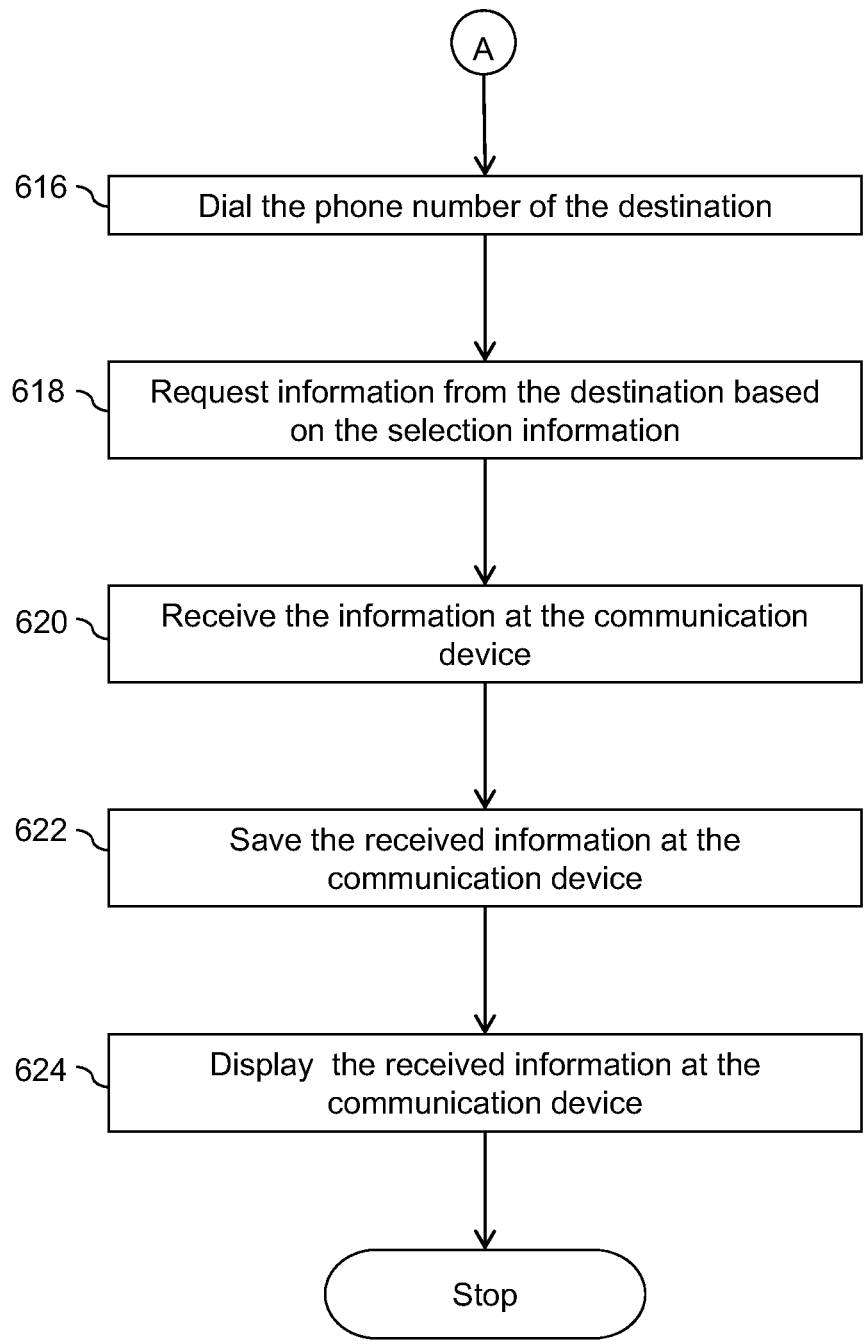

Having thus described the invention in general terms, reference will now be made to the accompanying drawings, which are not necessarily drawn to scale, and wherein:

FIG. 1A illustrates an exemplary environment where various embodiments of the invention function;

FIG. 1B illustrates another exemplary environment where various embodiments of the invention function;

FIG. 1C illustrates yet another exemplary environment where various embodiments of the invention function;

FIG. 2 illustrates an exemplary representation of a visual IVR menu associated with the phone number of the destination dialed on the communication device, in accordance with an embodiment of the invention;

FIG. 3 illustrates an exemplary display at the communication device after switching to a scheduling mode, in accordance with an embodiment of the invention;

FIGS. 4A and 4B illustrate exemplary components of the communication device for implementing a Visuphone, in accordance with an embodiment of the invention;

FIG. 5 illustrates exemplary components of the communication device for implementing the Visuphone, in accordance with another embodiment of the invention; and FIGS. 6A and 6B illustrates a flowchart diagram for providing enhancing telephony, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates an exemplary environment where various embodiments of the invention function. A user 106 may use a communication device 102a to connect to destinations 108a-n. Further, the communication device 102a may request information from the destination 108a-n. The communication device 102a can be a telecommunication device that can connect directly to a Public Switched Telephone Network (PSTN) 110. A person skilled in the art will appreciate, that the communication device 102a can also connect to a private telephone exchange. Examples of the communication device 102a include, but are not limited to, a telephone, a mobile phone, a smartphone or any other device capable of voice or data communication. The user 106 connects to a destination from the destinations 108a-n by dialing a phone number of a destination. The destinations 108a-n may include one or more audible Interactive Voice Response (IVR) menus. Further, the destinations 108a-n can have different audio IVR menus. For example, IVR menus of a hospital may be completely different from that of a bank. Typically, the audible IVR menu provided by the destinations 108a-n comprises audible options or instructions.

The communication device 102a includes a Visuphone 104 that may provide data regarding a phone number of the destinations 108a-n dialed from the communication device 102a. For example, the data may include geographical information of the destinations 108a-n and/or the user 106. Further, the Visuphone 104 may display a visual IVR menu on the communication device 102a corresponding to the audible IVR menu based on a phone number of the destination to be connected. The user 106 may be required to select various options from the visual IVR menu to obtain the required resource/information or service from the dialed destination. Various types of the destinations 108a-n that implement the audible IVR menu include, for example, banks, hotels, fast-food outlets, utility services providers, corporate offices, mobile phone service providers, hospitals and so forth. The Visuphone 104 may be hardware, software, or a firmware implemented on the communication device 102a, or a combination thereof. The visual IVR menu may have one or more options. Thereafter, the user 106 can select the options of the displayed visual IVR menu without the requirement to listen to the audible instructions.

In an embodiment of the invention, the communication device 102a can request for updates from a server through a communication network. The server may maintain the updated information of destinations and their associated properties. This may happen in a case when requested information is not available on the dialed destination. The communication network can include more than one communication devices. Examples of the communication network include, but are not limited to, the Network, PSTN, Local Area Network (LAN), Wide Area Network (WAN), and so forth.

FIG. 1B illustrates another exemplary environment where various embodiments of the invention function. As shown, a communication device 102b can be a communication device that can be connected directly to network 114. Examples of the communication device 102b include, but are not limited to, a personal computer, a laptop, a mobile phone, a smartphone, a fixed line telephone, a Voice Over Network Protocol (VOIP) phone or other devices capable of voice or data communication. The communication device 102b may include various applications or computer programs that enable the user 106 to use the communication device 102b for connecting to the destinations 108a-n through PSTN 110 over network 114 through a gateway 112. For example, the applications may be VOIP applications, such as but not limited to, Skype, Magic Jack, Google Talk and so forth. Examples of the network 114 include any wired or wireless network, such as but not limited to, LAN, WAN, a Wi-Fi network and so forth. As discussed with reference to FIG. 1A, the destinations 108a-n presents the audible IVR to the user 106. The communication device 102b includes the Visuphone 104 that displays a visual IVR menu corresponding to the audible IVR menu based on a dialed destination phone number. As discussed with reference to FIG. 1A, the Visuphone 104 may call a phone number of a destination of the destinations 108a-n automatically based on the predefined calling information.

FIG. 1C illustrates yet another exemplary environment where various embodiments of the invention function. As shown, the communication device 102b can be connected to the PSTN 110 through the network 114 or through the cellular network 116. Various service providers provide multiple or overlapping services to customers. For example, cable television service provider may also provide phone and Network service, optical Network provider may also provide phone or television services, WiMax service providers that provide phone service and so forth. The network 114 may be any service provider that provides such services, for example, but not limited to, cell phone services, wireless services, Network services, cable television services, or various combinations of the above or other type of services. As discussed with reference to FIG. 1A, the destinations 108a-n includes one or more audible IVR menus. The communication device 102b includes the Visuphone 104 which displays data corresponding to destination phone number dialed. Further, Visuphone 104 may display visual IVR menu corresponding to audible IVR menu of the destination phone number. Moreover, the visual IVR menu is displayed after the user 106 selects one or more destinations based on the information displayed. In an embodiment of the invention, the Visuphone 104 may call the dialed destination based on the predefined calling information automatically. In an embodiment, the Visuphone 104 may keep on calling to the dialed destination until the requested information is received. In an embodiment, the dialed destination may request the information requested by the Visuphone 104 of the communication device 102c, from the server of the communication network. Thereafter, the dialed destination may send the information received from the server to the Visuphone 104 of the communication device 102c. Further, the Visuphone 104 may save and/or display the received information at the communication device 102c.

FIG. 2 illustrates an exemplary representation of a visual IVR menu 202 associated with the phone number of the destination dialed on the communication device 102a, in accordance with an embodiment of the invention. The visual IVR menu 202 includes one or more options corresponding to every node in the audible IVR menu of the dialed destination of the destinations 108a-n. It is well known that graphics are easier to learn and are faster to recognize than words. Therefore, graphics are used in various computerized device interfaces. Various types of graphics can be displayed for example, animated icons, icons that highlight or animate when the node is highlighted, and so forth. The graphics may be displayed for each node or a few nodes based on the usability of the visual IVR menu 202. For example, for the node 210 an icon of a vegetable may be displayed to designate a vegetarian pizza, and for the node 216 of home delivery, an icon of house may be displayed. In an embodiment of the invention, the visual IVR menu 202 can be customized to display only the text, only the icons or both. Furthermore, the user 106 can suggest or use various icons based on his preferences. The visual IVR menu is specific to a destination.

Further, each of the destinations 108a-n may have more than one audio IVR menus. Therefore, different visual IVR menus corresponding to one or more audio IVR menus can be available for each of the destinations 108a-n. In an embodiment, the communication device 104 may include more than one visual IVR menus for each destination of the destinations 108a-n based on the time. Therefore, different visual IVR menus corresponding to a destination 108 might be presented to the user 106 depending on the time of dialing to the destination 108.

In an exemplary scenario, in a hotel, the food items in a daytime menu card may be different from a night menu card. Accordingly, the options in the visual IVR menu may differ. Therefore, the visual IVR menus for daytime and night can be different for the hotel. When the user 106 dials the phone number of the hotel in daytime, a daytime visual IVR menu can be displayed at the communication device 102a, and if the user 106 calls at night, a different menu can be displayed at the communication device 102a. Therefore, a visual IVR menu of the hotel displayed at the calling communication device for a call made at noon may be different then the visual IVR menu displayed for another call made at evening.

In an embodiment of the invention, a scheduling mode option 220 displayed on the screen along with the visual IVR menu associated with the dialed destination. The user 106 may switch the communication device 102a to a scheduling mode by selecting the scheduling mode option 220. When the communication device 102 is in scheduling mode, the Visuphone 104 may start saving the inputs of the user 106. The inputs from the user 106 may include the selection of one or more options of the displayed visual IVR menu 202. In the scheduling mode, the Visuphone 104 may display one or more input options on the screen to enter a call schedule by a user 106. The call schedule may include a date and a time information. The selection of the date and the time information is explained in conjunction with FIG. 3. Furthermore, the Visuphone 104 may automatically call a phone number of a destination of the destinations 108a-n automatically based on a predefined calling information. The predefined calling information can be entered and/or selected by the user 106. The predefined calling information may include the selection information such as one or more options of the visual IVR menu 202 that are selected by the user 106 in the scheduling mode. Further, the predefined calling information may include the call schedule, which is the date and time information for the call. In an embodiment of the invention, the predefined calling information may also include additional data such as a predefined time interval, maximum number of dialing attempts, waiting time, and so forth.

In another embodiment of the invention, the communication device 102a may be switched to the scheduling mode based on a predefined key sequence. The user 106 may press or select or enter a predefined key sequence for switching the communication device 102a to a scheduling mode. The predefined key sequence may be a combination of one or more keys. For example, the predefined key sequence may include two asterisks (*) after dialing a phone number such as 123-456-7890**. The Visuphone 104 may detect such predefined key sequence dialed and switch the communication device 102a to the scheduling mode. Thereafter, the Visuphone 104 may save the user inputs. Further, the Visuphone 104 may display the visual IVR menu associated with the dialed destination. Furthermore, the Visuphone 104 may allow the user 106 to schedule the call by entering date and time information.

FIG. 3 illustrates the communication device 104 after switching to a scheduling mode, in accordance with an embodiment of the invention. As discussed with reference to FIG. 2, the Visuphone 104 may save the inputs from the user 106 after switching to the scheduling mode. In an embodiment of the invention, the user 106 may enter and/or select a call schedule 302. For example, the call schedule 302 may include, but not limited to, a date and a time information. A calendar 304 may be displayed on the screen of the communication device 102a for entering and/or selecting the date information for scheduling the call. A time input box 306 may be displayed on the screen of the communication device 102a for entering and/or selecting the time information for scheduling the call. For example, the call schedule information will include a date Mar. 15, 2011, and time 11:25:40, therefore the Visuphone 104 dial at the phone number of the destination on Mar. 15, 2011 at 11:25:40 AM. In an embodiment, the time information may be displayed in 12 hour format. In another embodiment, the time information may be displayed in 24 hours format.

In another embodiment of the invention, the call schedule 302 may include a predefined schedule for calling to the destination. For example, the Visuphone 104 may automatically schedule a call in next five minutes on the same day, based on the predefined schedule. In an embodiment, the user 106 is not required to enter or select the date and the time information for scheduling the call. In such a case, the Visuphone 104 automatically schedules the call to the destination based on the predefined schedule. A person skilled in the art will appreciate that the date and time for predefined schedule is not limited to five minutes or same day, and can be edited by the user 106. Further, the call schedule 302 may also include additional information such as maximum number of calling attempts, waiting time, and so forth.

Thereafter, a communication is established between the communication device 102a and the dialed destination. After establishment of the communication, the Visuphone 104 may request and/or receive information from the dialed destination based on the selection information of the predefined calling information. In an embodiment, the Visuphone 104 may keep on dialing the phone number of the destination until the requested information is received from the dialed destination based on the selection information. In an exemplary scenario, the Visuphone 106 may be required to dial the phone number of the destination repeatedly when the requested information is not available on the dialed destination. The call schedule may further include the predefined time interval for calling the destination. For example, when the communication is not established with the dialed destination, the Visuphone 104 can call the destination after waiting for the predefined time interval such as after ten minutes. A person skilled in the art will appreciate, that the predefined time interval is not limited to ten minutes, and can be edited by the user 106. In an exemplary scenario, if the requested information is not available at the dialed destination, than the Visuphone 104 may wait for the predefined time interval of the call schedule and may call the previously dialed destination again, and may request for the desired information according to the selection information.

FIGS. 4A and 4B illustrate exemplary components of the communication device 102a for implementing the Visuphone 104, in accordance with an embodiment of the invention. The communication device 102a includes a system bus 426 to connect the various components. Examples of system bus 426 include several types of bus structures including a memory bus, a peripheral bus, or a local bus using any of a variety of bus architectures. As discussed with reference to FIG. 1A, the communication device 102a can be a communication device such as computer, a smart-phone and so forth. The communication device 102a can connect to PSTN 110 through a gateway 424, which is connected to Network 114 through a network interface 412. Input/Output (IO) interface 414 of the communication device 102a may be configured to connect external or peripheral devices such as a memory card 416, a keyboard 418, a Universal Serial Bus (USB) device 420 and a mouse 422. Although not shown, various other devices can be connected through IO interface 4104 to the communication device 102a. In an embodiment of the invention, communication device 102a may be connected to a hub that provides various services such as voice communication, Network access, television services and so forth. For example, the hub may be a Home Gateway device that acts as a hub between the home environment and the Broadband Network.

The communication device 102a includes a display 402 to output graphical information to the user 106. In an embodiment of the invention, the display 402 may include a touch sensitive screen. Therefore, the user 106 can provide inputs to the communication device 102a by touching display 402 or by point and click using the 'mouse'. Memory 406 of the communication device 102a stores various programs, data and/or instructions that can be executed by a Processor 404. Examples of the memory 406 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 102a. The memory 406 may include Operating System (OS) (not shown) for the communication device 102a to function. Further, the memory 406 may include other applications that enable the user 106 to communication with the destinations 108a-n. Examples of other applications include, but are not limited to, Skype, Google Talk, Magic Jack, and so forth. Other applications may be stored as software or firmware on the communication device 102a.

Further, the memory 306 includes the Visuphone 104 for providing a visual representation of the destinations 108a-n. As discussed with reference to the FIG. 1A, the Visuphone 104 may be hardware, a software or a firmware stored on the communication device 102a. In an embodiment, the Visuphone 104 may be implemented as plug-in to other applications. The Visuphone 104 may further determine the current time and/or date from the system clock or the internet. The visual IVR menus are stored in a database 408 in memory 406 of the communication device 102a. As discussed with reference to FIG. 3, the database 408 may store the predefined calling information. Further, the database 408 may store the selection information and the call schedule. The call schedule may include the date information and the time information. The call schedule may also include the predefined time interval and predefined schedule. In an embodiment, the database 408 may further store the predefined schedule and predefined time interval. The communication device 102a may also request or receive updates from the server at a predefined time. The predefined time may be for example, once a week, once a month, or any other interval predefined by the user 106 or the Visuphone 104.

In an embodiment, the Visuphone 104 may display a visual IVR menu associated with the dialed destination. In an embodiment, the Visuphone 104 may display a mode option on a screen of the communication device 102a. The mode option may be selected by a user 106 for switching the mode of the communication device 102a. Based on the selected mode of the communication device 102, one or more input or output options may be displayed on the screen. Example of the one or more input or output options include, but are not limited to, a date of making a call, a time of making a call, a predefined time interval for repeating a call, and so forth.

In an embodiment of the invention, the mode option is a scheduling mode option. The user 106 may switch the communication device 102 to a scheduling mode by selecting the mode option. In an embodiment, when the communication device 102 is in scheduling mode, the Visuphone 104 may save the inputs from the user 106. In an embodiment, the Visuphone 104 may save the options of the displayed visual IVR menu selected by the user 106. In the scheduling mode, the Visuphone 104 may display one or more input options on the screen to enter a call schedule including a date and a time information. In an embodiment, the Visuphone may further ask the user 106 to enter other important information required for dialing the phone number of the destination automatically at a later time. Thereafter, the user 106 may enter the date and time information for dialing the phone number of the destination. Furthermore, the Visuphone 104 may call a phone number of a destination of the destinations 108a-n automatically based on the predefined calling information. The predefined calling information can be entered by the user 106. The predefined calling information may include the selection information and the call schedule. The selection information may include one or more options of the displayed visual IVR menu associated with the dialed destination, selected by the user 106.

In an embodiment of the invention, the Visuphone 104 may establish a communication with the dialed destination based on the predefined calling information. Further, the Visuphone 104 may request information from the dialed destination based on the predefined calling information. Furthermore, the Visuphone 104 may receive the requested information from the dialed destination based on the predefined calling information. In an embodiment, the user 106 may also interact with the dialed destination after establishment of the communication. Furthermore, the Visuphone 104 may save the received information at the communication device 102a. In an embodiment, the Visuphone 104 may convert the format of the received information from a first format to a second format. In an embodiment, the first format of the received information may be an audio format. Examples of the audio format include, but are not limited to, WAV, Real Audio, Musical Instrument Digital Interface (MIDI), Windows Media Audio (WMA), MP3, Ogg, and so forth. In an embodiment, the second format may be a text format such as a Unicode text, Rich Text format, HyperText Markup Language (HTML) or any other format compatible with the communication device 102a. In an embodiment, the Visuphone 104 may display the received information at the communication device 102a.

The user 106 may dial a phone number corresponding to a destination using keyboard 418. The keyboard 418 may be a physical keyboard or a virtual keyboard displayed on a touch screen display 402. In an embodiment, the keyboard 418 is a keypad on the communication device 102a. Subsequently, after some processing by the Visuphone 104, the visual IVR menu 202 corresponding to dialed destination phone number is searched and displayed on display 402.

In an embodiment of the invention, the visual IVR menu may be provided in real-time to the user 106. In an embodiment of the invention, the visual IVR menu is provided by a messaging service such as a Short Messaging Service (SMS). Therefore, destinations may provide customized visual IVR menu to the user 106. The visual IVR menu may be customized based on the profile of user. In an embodiment of the invention, the profile may be generated based on access pattern of user or the data capture by a hub connected to the communication device 102a.

The user 106 can interact with the visual IVR menu by pressing a desired button from the keyboard 418. For example, the user can press a '3' key from the keyboard 418 to select a node 3 in the visual IVR menu 202. Further, the user 106 can directly select the node 3 of the visual IVR menu 202 from the display 402, in case of a touch sensitive screen. Depending on the complexity or size of destinations, visual IVR menu 202 may have various nodes. Moreover, display area of the display 402 may be limited or small. As a result, all the nodes of the visual IVR menu 202 may not be displayed together on the display 402. In such a case, the Visuphone 104 is configured to allow the user 106 to navigate by scrolling horizontally and/or vertically to view nodes on the visual IVR menu 202. Further, the Visuphone 104 may detect the capability of the communication device 102a before displaying the visual IVR menu 202. For example, in case the communication device 102a is a basic mobile phone with limited functionality of the display screen. Therefore, the Visuphone 104 may display the visual IVR menu in form of a simple list. Similarly, a list may be displayed in case of fixed line or wired telephones. Moreover, in case the communication device 102a includes a high capability screen, such as but not limited to an iPhone, then the visual IVR menu is displayed in form of graphics. Subsequently, after the user 106 selects a desired action from the visual IVR menu 202, a connection is established between the communication device 102a and the selected destination. In one embodiment, the Visuphone 104 is configured to detect and present an application or computer program available on the communication device 102a.

In an embodiment, the user 106 may dial a phone number from a VOIP application 428 on the communication device 102b, as shown with reference to FIG. 4A. The phone number may correspond to any of destination from the destinations 108a-n. In an embodiment, the user 106 selects a pre-stored phone number from the VOIP application 428. As discussed with reference to FIG. 2, the representation of the visual IVR menu 202 and the scheduling mode option 220 can be provided on the display 402. Subsequently, after detecting selection from the user 106, the call schedule 302 including a calendar 304 and time input box 306 can be displayed on the display 402.

In an embodiment, the Visuphone 104 may include a VOIP plug-in that monitors the outgoing calls made from the VOIP application. Therefore, the VOIP plug-in may search each dialed number in the database 408. In case, the dialed number is found in database 408 and is associated with an audible IVR, then the VOIP plug-in may display the visual IVR menu corresponding to the audible IVR menu of the dialed destination phone number.

In one embodiment, the Visuphone 104 is configured to detect and present applications suitable to the user 106 for initiating the connection. For example, the Visuphone 104 may detect more than one VOIP applications present in the communication device 102b and present them to the user 106 on the display 402. Thereafter, the user 106 can select an application to be used or initiate the connection in a default configuration. The default configuration can be for example, a VOIP application 428 on which destination phone number was dialed. In another embodiment, the user 106 may select a phone number displayed in applications such as a browser, messenger, or a mail client. Subsequently, the Visuphone 104 detects and presents applications suitable to the user 106 for initiating the connection. Furthermore, the Visuphone 104 is configured to display the visual IVR menu 202 for the phone number selected from the applications.

In an embodiment, the communication device 102b may include a web browser to display web pages from the Network and/or other computer networks. Various websites provide a phone number on the web pages as a click-to-talk button. The clickable button can provide, for example, a contact number of executives of the organization. The clickable button may be programmed to display a phone number of the organization and/or display a user a form to provide his contact details, so that an executive from the organization can call back the user. The Visuphone 104 is configured to detect a connect button a webpage. Connect button may be used by the Visuphone 104 to initiate a connection to a destination. The Visuphone 104 detects and launches a VOIP application on the communication device 102b. In an embodiment, in case more than one application is available on the communication device 102, the Visuphone 104 selects a VOIP application preferred by the user 106. Moreover, the Visuphone 104 may be configured to automatically login into the VOIP application. In an embodiment, the user 106 stores the login details for the VOIP application in the Visuphone 104. Further, the Visuphone 104 displays a visual IVR menu corresponding to audible IVR menu of the destination connected once clicked on the connect tab. Therefore, the user 106 can connect to the destination from web browser automatically and may not be required to dial the phone number or provide call-back information.

FIG. 5 illustrates exemplary components of the communication device 102b for implementing the Visuphone 104, in accordance with another embodiment of the invention. The communication device 102b includes a system bus 526 to connect the various components. Examples of the system bus 526 include, but are not limited to, a memory bus or memory controller, a peripheral bus, or a local bus using any of a variety of bus architectures. As discussed with reference to FIG. 1B, the communication device 102b can be a computing device such as, but not limited to, a personal computer, a laptop, a mobile phone, a smart-phone, and so forth. The communication device 102b can connect to the network 114 through a network interface 510. Further, the communication device 102b can connect to the PSTN 110 through the gateway 112 and the network 114 through the network interface 510. An Input/Output (IO) interface 512 of the communication device 102b may be configured to connect external or peripheral devices such as a mouse 514, a keyboard 516, a speaker 518, a camera 520, and a microphone 522. Although not shown, various other devices such as a hard disk, a Universal Serial Bus (USB) device or others can be connected through the IO interface 512 to the communication device 102b. A person skilled the art will appreciate that although not described, various other types of devices capable of voice and/or data communication can be connected to the communication device 102b.

The communication device 102b includes a display interface 502 to connect to a display 508. The display interface 502 can be for example, a video adapter. The display 508 outputs graphical information to the user 106. In an embodiment of the invention, the display 508 includes a touch sensitive screen. Therefore, the user 106 can provide inputs to the communication device 102b by touching display 508 or by scrolling and pointing with the mouse 514 and a click. Memory 506 of the communication device 102b may store various programs, data and/or instructions that can be executed by a processor 504. Examples of the memory 506 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 102b. The memory 506 may include Operating System (OS) (not shown) for the communication device 102b to function. Further, the memory 506 may include other applications that enable user 106 to communication with the destinations 108a-n. Examples of other applications include, but are not limited to, Skype, Google Talk, Magic Jack, and so forth. Other applications may be software or firmware stored on the communication device 102b.

Further, the memory 506 may include the Visuphone 104 for calling the dialed destination based on the predefined calling information. Further, the Visuphone 104 is capable of presenting a visual IVR menu corresponding to the audible IVR menu of a selected destination as discussed with reference to FIG. 3. Furthermore, the Visuphone 104 may request and/or receive information from the dialed destination based on the selection information of the predefined calling information. The Visuphone 104 may be an application stored as a software or firmware on the communication device 102b. The Visuphone 104 may establish a communication with the dialed destination based on the call schedule. In an embodiment, the Visuphone 104 dials a phone number of a destination of the destinations 108a-n automatically, without any intervention by the user 106. The memory 506 further includes a database 408. As discussed in FIGS. 4A and 4B, the visual IVR menus are stored in the database 408 in memory 506 of the communication device 102b. Further, the database 408 may include the selection information and the call schedule.

Depending on the complexity or size of the destinations, the visual IVR menu 202 may have various nodes. For example, an organization with 50 departments may have more menu options or nodes than that of an organization with 10 departments. Further, the display area of display 508 may be limited. As a result, all the nodes of the visual IVR menu 202 may not be displayed together on display 508. In such a case, the Visuphone 104 is configured to allow the user 106 to navigate by scrolling horizontally and/or vertically to view nodes on the visual IVR menu 202. Moreover, the user 106 can search for a desired option from the visual IVR menu 202. Subsequently, after user 106 selects a desired option from the visual IVR menu 202, a connection is established between device 102b and the dialed destination based on the selected action.

Another embodiment of the invention allows the user to select the visual IVR menu using car display like GPS display. Hands-free cell phone system is used in many cars as a separated device or as an integrated system in the car. These devices allow the user to talk with the cell phone without holding the cell phone in his hands. Some devices are using the car speakers for the phone call. In many cases, the hands-free system can use a display screen in the car like GPS screen or other display. Following voice menu while driving might not be the optimal way to use hands-free cell phone system. In some cases, selecting an option from a visual IVR menu is preferred. While driving or stopping in red light, it might be easier to use larger display like the GPS display in the car. The display can present the visual IVR menu and the user can select the option from the menu. The computing engine to support the visual IVR menu could be embedded in the car GPS system or in another controller that have access to the car display. Once the system recognizes a destination of a call to be an IVR it will access the database, and pull out the representation of one or more destinations and display. Accordingly all the other features of the Visuphone 104 could be incorporated.

FIGS. 6A and 6B illustrate a flowchart diagram for providing enhanced telephony, in accordance with an embodiment of the invention. The user 106 may dial, select or receive one or more destination phone numbers to connect to a destination from the communication device 102. The destinations 108a-n may include an audible IVR menu for interaction with the user 106. Further, the communication device 102 may include the Visuphone 104 to display a visual IVR menu associated with a phone number of a destination dialed by the user 106. The Visuphone 104 may further display a scheduling mode option 220 at the communication device 102b, as discussed with reference to the FIG. 3. The Visuphone may establish a communication with the phone number of the destination based on the predefined calling information. In an exemplary scenario, a user of the communication device calls a bank, than a scheduling mode option and a visual IVR of the bank may be displayed on the communication device. Sometimes, the user might not be able to receive desired information during this call then the user can switch to a scheduling mode by selecting the scheduling mode option. Thereafter, the Visuphone 104 may ask user to enter a predefined calling information. Later, the Visuphone 104 may dial the phone number of the previously dialed bank based on the predefined calling information.

At step 602, a phone number of a destination is dialed from the communication device 102. The user 106 may dial the phone number of destination of the destinations 108a-n. At step 604, a visual IVR menu associated with the dialed number and a scheduling mode option is displayed at the communication device 102. The visual IVR menu 202 and the scheduling mode option 220 may be displayed on the display 402 of the communication device 102n. In an embodiment, the user 106 may interact with the dialed destination and request for information, by selecting one or more options of the visual IVR menu. In an embodiment, the requested information may not be available at the dialed destination at the time of the call. Therefore, in such a case the user 106 may need to dial the destination again or the user 106 may schedule a call at later time. At step 606, the communication device 102 is switched to a scheduling mode. The user 106 selects the scheduling mode option for switching the communication device 102 to scheduling mode. As discussed with reference to FIGS. 1A and 3, in scheduling mode the Visuphone 104 may save inputs such as a predefined calling information from the user 106. The predefined calling information may include a selection information and a call schedule.

At step 608, the Visuphone 104 saves the selection information including the one or more options of the displayed visual IVR menu. The one or more options are selected by the user 106. Thereafter, a display 10 of the communication device 102 switches to the display 20 including the calendar 304 and the time input box 306. The user 106 may enter the date and time information in the calendar 304 and time input box 306 respectively. At step 610, the Visuphone 104 saves the call schedule including the date and time information. At step 612, it is checked whether the entered call schedule's date and time has arrived. The Visuphone 104 may perform the checking by comparing the call schedule's date and time with the current date and time. The Visuphone 104 determines the current date and time based on the system clock and/or internet. If the call schedule's date and time is not equal to current date and time, then at step 614 the process waits for the call schedule's date and time to arrive, otherwise the process control goes to step 616. At step 616, the Visuphone 104 dials the phone number of the destination. The Visuphone 104 dials the phone number of the destination based on the call schedule of the predefined calling information and without any user intervention. Thereafter, the Visuphone 104 may establish a connection with the dialed destination.

At step 618, the Visuphone 104 requests information from the dialed destination based on the selection information of the predefined calling information. In an embodiment, the requested information may not be available at the dialed destination at this time, so the Visuphone 104 may wait for the predefined interval and may dial the phone number of the destination again. Examples of the predefined time interval may include, but are not limited to, thirty seconds, one minute, five minutes, ten minutes, twenty minutes, and so forth. In another embodiment, the dialed destination may transfer the request for the information by the Visuphone 104 to the server, when the information is not available at the dialed destination. In another embodiment, when the information is not available at the dialed destination, the request of the information may be transferred to another destination of the destinations 108a-n. In an embodiment, the user 106 may interact with the dialed destination after establishment of the communication by the Visuphone 104.

At step 620, the requested information is received at the communication device 102. The dialed destination may send the requested information to the communication device 102 based on the availability of the information. In an embodiment, the requested information may be received from the another destination of destinations 108a-n. In yet another embodiment, the Visuphone 104 may receive requested information from the server. In an embodiment, the Visuphone 104 may convert the format of the received information from a first format to a second format. In an embodiment, the first format of the received information may be an audio format. Examples of the audio format include, but are not limited to, WAV, Real Audio, Musical Instrument Digital Interface (MIDI), Windows Media Audio (WMA), MP3, Ogg, and so forth. In an embodiment, the second format may be a text format such as a Unicode text, Rich Text format, HyperText Markup Language (HTML) or any other format compatible with the communication device 102a. At step 622, the Visuphone 104 saves the received information at the communication device 102. In an embodiment, the saved information may be accessed by the user 106 in real time. In another embodiment, the saved information may be accessed by the user 106 later. At step 624, the Visuphone 104 displays the received information at the communication device 102. As discussed with reference to FIG. 4A, the received information is displayed on the display 402 of the communication device 102.

In another embodiment of the invention, electronic yellow pages directory allows the dialing the number directly from the directory and further provides representation of one or more destinations and the visual IVR menu of the destination. The user can select the exact destination before dialing or follow the visual IVR menu after dialing. For example, an airline company might have various option, menus and layers in the large organization. Selecting the exact department in the organization before dialing can save the user the time and overhead of listening to the menu and making decisions based on the voice menu. The yellow pages company can have a copy of the visual IVR menu database or can be connected to a visual IVR menu service in order to provide the menu to the user.

Alternatively an enhanced web based yellow page could be provided, wherein the user can first choose the provider he requires to contact. Thereafter, if that destination provides an IVR, then the enhanced yellow page will use the visual IVR menu database to present a visual IVR menu on the web page. Moreover, the user can click to choose the internal destination of that provider and the enhanced yellow page may accordingly initiate the call. The call could be made using the conventional telephone network or PSTN. In this case, the enhanced yellow page may need the user's telephone number to perform the connection. Alternatively, the enhanced yellow page could use a VOIP to connect the user over the web to the IVR of the destination.

In some IVR systems, the user may have to wait or hold on a queue of previous dialers until the specific department or agent is available. In another embodiment of the invention, the enhanced yellow page system will connect the user only after the specific agent is available, without waiting in a long waiting line queue. The system can recognize that the waiting queue message of the specific department, and to connect the user only after the agent is answering. Therefore, the waiting time of the user on the phone queue that sometimes may be very long, may be reduced. The system can park on the line for the waiting line on the specific entry in the menu; as soon as the agent is available the user gets a signal to start the conversation with the agent.

An advantage of the invention is that the user himself/herself does not have to dial the destination again and again for receiving information. The Visuphone 104 present at the communication device 102 of the user 106 may dial the phone number of the destination automatically based on the predefined calling information set by the user 106. Further, the Visuphone 104 requests and receives the requested or inquired information automatically.

Another advantage of the invention is that the user does not have to wait for long time for retrieving any information from a destination. When the requested information is not available, the user may schedule a call at later time by entering few settings on the communication device 102. Thereafter, the Visuphone 104 may dial the phone number of the destination according to the entered settings automatically and may download the desired information. The downloaded information may be used by the user at a later time.

An aspect of the invention is to provide a method for requesting and receiving information from a destination at a communication device without any user intervention.

Another aspect of the invention saves the effort made by the user of the communication device for retrieving information from an IVR system of the dialed destination. The Visuphone dials the phone number of the destination and retrieves the information automatically depending on the predefined calling information. Later, the user can use the retrieved information as per his/her convenience. In an embodiment, the user may not wish to use the information at the time of its retrieval. In such a case the information is stored and can be accessed later.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A communication device comprising:
   a database comprising at least one visual Interactive Voice Response (IVR) menu associated with each of a plurality of destinations;
   means for initiating dialing a phone number of a destination of the plurality of destinations based on a predefined calling information, wherein the predefined calling information is selected from a visual IVR menu associated with the destination;
   means for receiving information from the dialed destination based on the predefined calling information; and
   means for displaying the received information, wherein the database further comprises predefined calling information, wherein the predefined calling information comprises: a selection information comprising one or more options of the displayed visual IVR menu associated with dialed destination selected by a user; and a call schedule comprising a time of day of dialing the phone number of the destination.

2. The communication device of claim 1 further comprising:
   means for dialing, by the user, the phone number of the destination of the plurality of destinations;
   means for displaying the visual IVR menu associated with the dialed destination, wherein the visual IVR menu comprises a schedule mode option; and
   means for selecting, by the user, the schedule mode option.

3. The communication device of claim 2 further comprising means for automatically selecting, by the communication device, the scheduling mode.

4. The communication device of claim 3 further comprising:
   means for storing the predefined calling information when the scheduling mode is selected, wherein the predefined calling information is selected by the user;
   means for establishing a communication with the dialed destination;
   means for requesting the information from the dialed destination based on the predefined calling information; and
   means for storing the received information.

5. The communication device of claim 1 further comprising means for converting the received information from a first format to a second format.

6. A communication device comprising:
   a processor; and
   a memory coupled to the processor, comprising:
   a database comprising at least one visual Interactive Voice Response (IVR) menu associated with each of a plurality of destinations;
   instructions executable by the processor for initiating dialing a phone number of a destination of the plurality of destinations based on a predefined calling information, wherein the predefined calling information is selected from a visual IVR menu associated with the destination;
   instructions executable by the processor for receiving information from the dialed destination based on the predefined calling information; and
   instructions executable by the processor for displaying the received information, wherein the database further comprises predefined calling information, wherein the predefined calling information comprises: a selection information comprising one or more options of the displayed visual IVR menu associated with dialed destination selected by a user; and a call schedule comprising a time of day of dialing the phone number of the destination.

7. The communication device of claim 6, wherein the memory further comprises instructions executable by the processor for:
   dialing, by the user, the phone number of the destination of the plurality of destinations;
   displaying the visual IVR menu associated with the dialed destination, wherein the visual IVR menu comprises a schedule mode option; and
   selecting, by the user, the schedule mode option.

8. The communication device of claim 7, wherein the memory further comprises instructions executable by the processor for:
   storing the predefined calling information when the scheduling mode is selected, wherein the predefined calling information is selected by the user;
   establishing a communication with the dialed destination;
   requesting the information from the dialed destination based on the predefined calling information; and
   storing the received information.

9. The communication device of claim 8, wherein the memory further comprises instructions executable by the processor for automatically selecting, by the communication device, the scheduling mode.

10. The communication device of claim 8, wherein the memory further comprises instructions executable by the processor for converting the received information from a first format to a second format.

11. The communication device of claim 10, wherein the first format is an audio format.

12. The communication device of claim 10, wherein the second format is a text format.

13. A method for providing enhanced telephony, the method comprising:
   initiating dialing, by a communication device, a phone number of a destination of a plurality of destinations based on a predefined calling information, wherein the predefined calling information is selected from a visual Interactive Voice Response (IVR) menu associated with the destination;
   receiving, at the communication device, information from the dialed destination based on the predefined calling information; and
   displaying the received information, wherein the database further comprises predefined calling information, wherein the predefined calling information comprises: a selection information comprising one or more options of the displayed visual IVR menu associated with dialed destination selected by a user; and a call schedule comprising a time of day of dialing the phone number of the destination.

14. The method of claim 13 further comprising:
   dialing, by the user, the phone number of the destination of the plurality of destinations;
   displaying, at the communication device, the visual IVR menu associated with the dialed destination, wherein the IVR menu comprises a schedule mode option; and
   selecting, by the user, the schedule mode option.

15. The method of claim 14 further comprising automatically selecting, by the communication device, the scheduling mode.

16. The method of claim 15 further comprising:
   storing, at the communication device, the predefined calling information when the scheduling mode is selected, wherein the predefined calling information is selected by the user;
   establishing, by the communication device, a communication with the dialed destination;
   requesting, by the communication device, the information from the dialed destination based on the predefined calling information; and
   storing, at the communication device, the received information.

17. The method of claim 16 further comprising converting the received information from a first format to a second format.

* * * * *